Dec. 23, 1958 J. TOGGENBURGER 2,865,488

PROPORTIONAL LETTER FEED MECHANISM

Filed April 1, 1955 8 Sheets-Sheet 1

INVENTOR
JOHN TOGGENBURGER
BY Jesse A. Holton
ATTORNEY

PROPORTIONAL LETTER FEED MECHANISM

Filed April 1, 1955 8 Sheets-Sheet 2

INVENTOR.
JOHN TOGGENBURGER

BY Jesse A. Holton

ATTORNEY

Dec. 23, 1958 J. TOGGENBURGER 2,865,488

PROPORTIONAL LETTER FEED MECHANISM

Filed April 1, 1955 8 Sheets-Sheet 3

INVENTOR.
JOHN TOGGENBURGER

BY Jesse A. Holton

ATTORNEY

PROPORTIONAL LETTER FEED MECHANISM

Filed April 1, 1955 8 Sheets-Sheet 4

INVENTOR.
JOHN TOGGENBURGER

BY Jesse A. Holton

ATTORNEY

Dec. 23, 1958 J. TOGGENBURGER 2,865,488

PROPORTIONAL LETTER FEED MECHANISM

Filed April 1, 1955 8 Sheets-Sheet 5

INVENTOR.
JOHN TOGGENBURGER

BY Jesse A. Holton

ATTORNEY

INVENTOR.
JOHN TOGGENBURGER
BY Jesse A. Holton
ATTORNEY

INVENTOR.
JOHN TOGGENBURGER
BY Jesse A. Holton
ATTORNEY

PROPORTIONAL LETTER FEED MECHANISM

Filed April 1, 1955 8 Sheets-Sheet 8

INVENTOR.
JOHN TOGGENBURGER
BY Jesse A. Holton
ATTORNEY 2,865,488
Patented Dec. 23, 1958

2,865,488

PROPORTIONAL LETTER FEED MECHANISM

John Toggenburger, Hartford, Conn., assignor to Underwood Corporation, New York, N. Y., a corporation of Delaware Application April 1, 1955, Serial No. 498,661

27 Claims. (Cl. 197—84)

This invention relates to typewriting machines in general, and more particularly to mechanisms for letter-feeding a typewriter carriage proportionally to the widths of imprints made by the character types.

The invention is an improvement over the mechanisms disclosed in the following patents: Brown No. 895,238 dated August 4, 1908, Reid No. 2,202,565, dated May 28, 1940, Reid No. 2,211,911, dated August 20, 1940, and Stickney No. 2,111,410, dated March 15, 1938.

In general it is an object of the invention to provide a proportional letter-feed typewriter which is substantially as efficient and reliable in operation as the conventional uniform letter-feeding typewriters.

It is an important object of the invention also to provide a reliably functioning proportional letter-feeding mechanism of simple and economically manufacturable construction.

A further object of the invention is to provide a proportional letter-feeding mechanism which in a simple, efficient and economical manner is controlled at operations of different width types to cause feed spaces proportional to the characters typed.

It is also an object of the invention to provide in connection with a proportional feed mechanism having a feed measuring dog which at each typing operation is released for taking up a new relation to a toothed member, a device which for reliable performance of the feed mechanism momentarily compels a halt of the carriage, but substantially without impeding the carriage more than is necessary to assure an appropriate measure of feed.

Proportional letter-feed mechanisms require differential conditioning in correlation with the width of the operated type, and to effect such conditioning the typing mechanism is usually subjected to a considerable extra load. This affects very materially the strength of the imprints and is serious in machines wherein the type carriers are power operated to different degrees partially toward the printing position and complete their movements by momentum. The requirement in these machines for universally adjusting the imprint strength for all type actions aggravates the problem further.

It is therefore a further object of the invention to provide mechanism for control of a proportional letter-feed mechanism which is efficient and has substantially no impeding influence on the typing mechanism, so that the machine will yield substantially unaffected imprints.

It is a still further object of the invention to provide in association with a proportional letter-feeding mechanism, efficient, simple, controlling apparatus which for most type actions is normally readily controlling to produce the required magnitude of carriage feed and which for differential conditioning for other feed yields includes several power devices selectively called into operation by other type actions against insignificant resistance, so that the imprint force is substantially unaffected.

An object ancillary to the last stated one is to provide said power means in the form of electromagnets or the like and to provide for efficient selective closure of circuits for said magnets under type action control.

It is a still further object of the invention to provide an efficient case-shift controlled switching mechanism whereby in connection with the typing of certain upper and lower case characters various type-action controlled contact means exercise differently selective circuit-closing control over the space-selecting magnets depending on the prevalent case-shift state of the machine.

Other objects and features will be in part obvious and in part pointed out particularly in the detailed description of a preferred embodiment of the invention which follows hereinafter.

A proportional letter spacing typewriter, in order to meet with commercial success, must in all respects be equal substantially in accuracy and speed of operation with conventional uniform spacing typewriters. It will be appreciated that construction of a proportional letter-feed mechanism, particularly in view of the fine feed positions at which the carriage must be located accurately after various different kinds of operations, such as tabulating, carriage returning and back spacing operations, entails many ancillary problems influencing in a considerable measure the structure and arrangement of the mechanism of the invention featured herein. Accordingly, for a more comprehensive understanding of the ramifying subject of the invention, the disclosure made herein reaches in some respects beyond the subject matter actually embraced in the claims.

Referring now to the drawings, Figure 1 is a right-hand sectional side view of the machine, showing portions of a proportional letter-feeding mechanism, a tabulating mechanism and a carriage-returning mechanism, the section being taken generally through the middle of the machine.

Figures 12, 13, 14, 15, 16, 17, 18, 19, 19A:
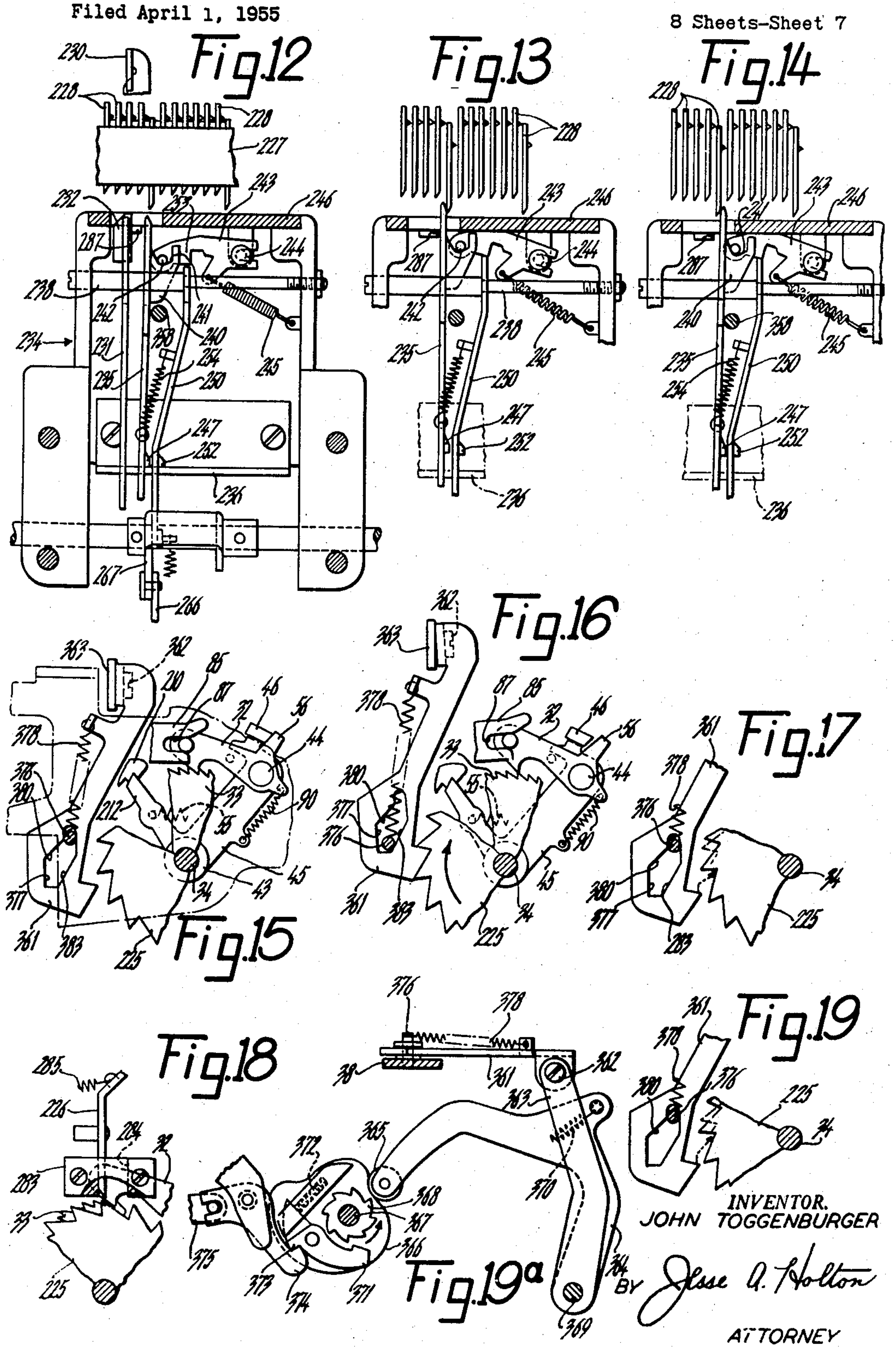
Figure 12 is a front view of a portion of the tabulating mechanism, including a projectable control element, the mechanism being in a normal state.
Figures 13 and 14 are similar to Figure 12 but the projectable element has been projected ultimately to function in causing the termination of the tabulating run.
Figure 15 shows a fragment of the proportional spacing mechanism, along with a pawl for action on a coarsely toothed wheel, for back-spacing the carriage to positions variant in accord with a certain multiple of a feed increment, all parts being in their normal positions.
Figure 16 is similar to Figure 15 but the back-spacing pawl is shown approaching fully operated position.

In Figures 17 and 19 the coarsely toothed wheel of Figure 15 has different incremental positions, but is rotatable by the back-space pawl to identical coarse-tooth positions.

Figure 18 is a fragmentary showing of a device active at tabulations and carriage returns to arrest the carriage in positions variant in accord with a certain multiple of a feed increment.

Figure 19*a* is a right-hand side view of the back-spacing mechanism shown in Figure 15, along with a power actuating mechanism therefor.

Figures 20, 21, 22, 23, 24, 25, 26:
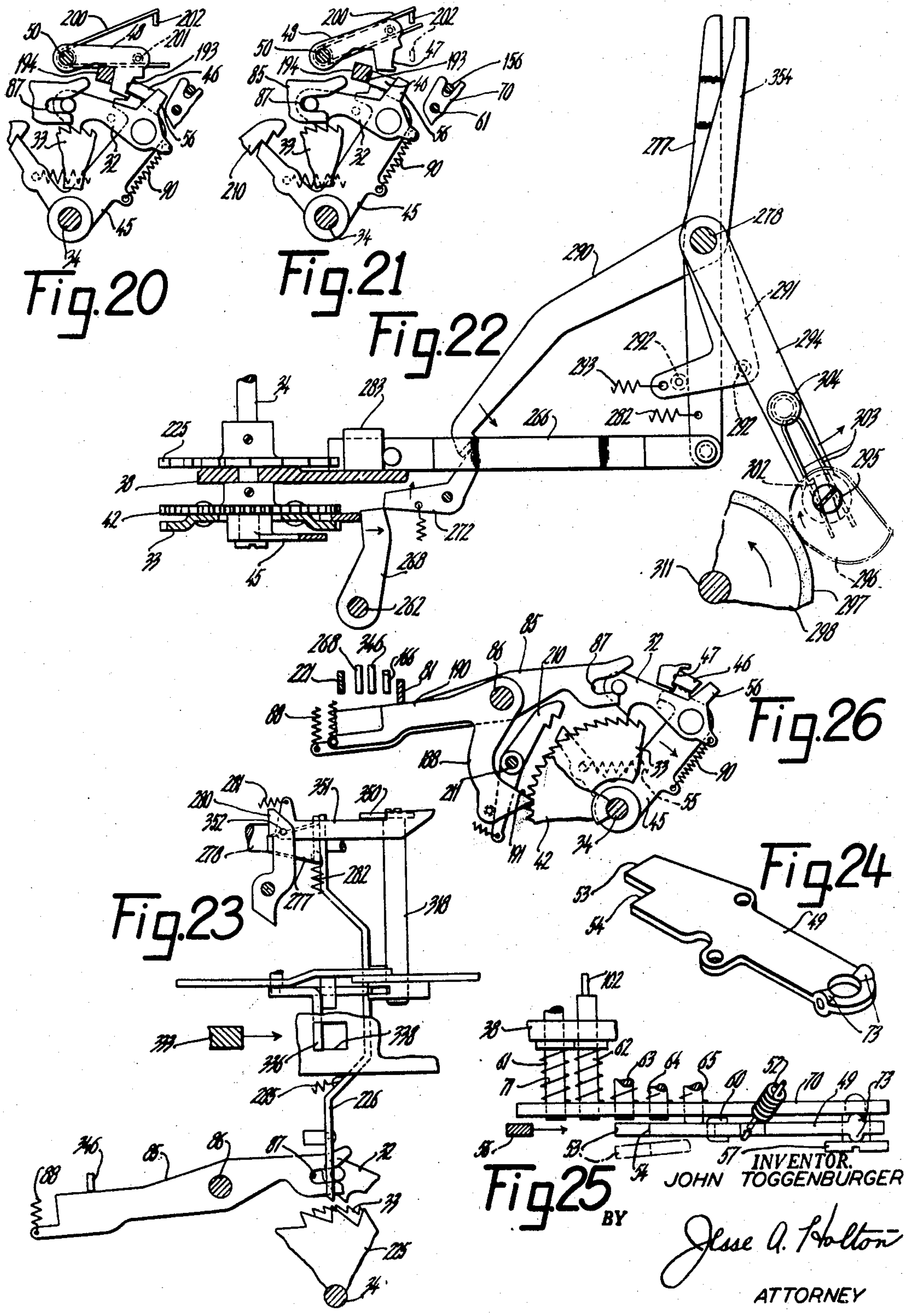

Figure 20 is a plan view showing an escapement dog operated to the limit of an abutment for producing normal proportional spacing and showing control mechanism in a condition whereby in the next escapement operation said escapement dog is limited by another abutment for producing more open proportional spacing.

Figure 21 is similar to Figure 20 but the mechanism is conditioned for open proportional spacing.

Figure 22 is a sectional side view illustrating a mechanism for arrest of the carriage at tabulations, the mechanism being shown in the process of movement to an inactive position.

Figure 23 is a fractional plan view of certain parts related to carriage interception at tabulations and carriage returns, the parts having been conditioned by an institution of a carriage return operation to be responsive to the last part of the return movement of the carriage to effect the interception thereof.

Figure 24 is a perspective illustration of a space controlling stop.

Figure 25 shows a variably conditionable stop mechanism of the proportional spacing mechanism.

Finally, Figure 26 is a plan view showing the spacing dog of the proportional spacing mechanism actuated free of the escapement wheel and another dog temporarily halting the carriage by co-action with another wheel.

Figure 1:
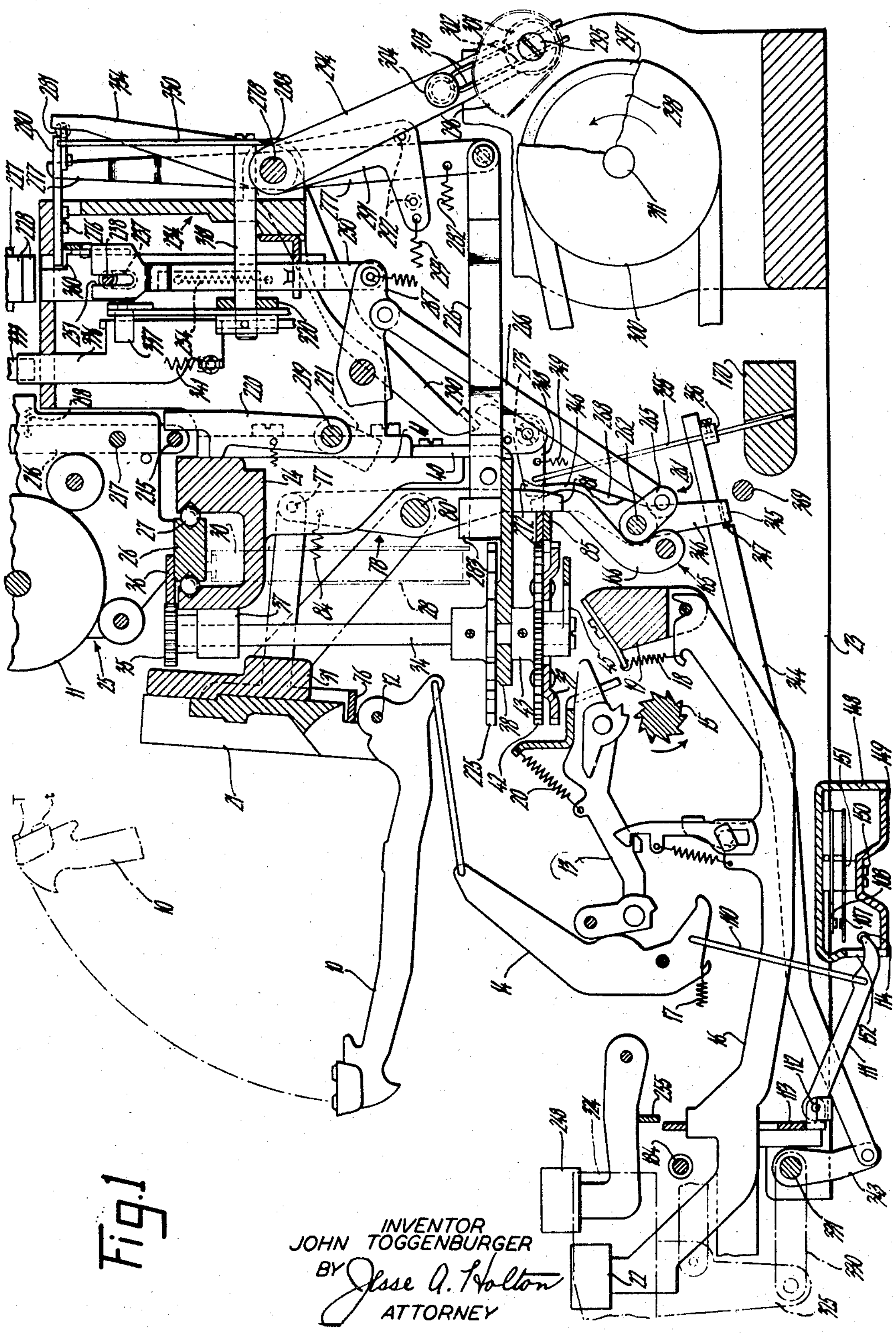

Referring now more particularly to Figure 1 the invention is shown embodied in an Underwood all-electric typewriter which embodies a power typing mechanism of the kind shown in the patent to Yaeger, No. 2,254,764, dated September 2, 1941. Said typing mechanism includes a complement of type bars 10 individually swingable on a segment 21, about a common fulcrum rod 12, to type at a common typing point against a platen 11. Each type bar 10 is power operable by an actuator 13 through a train of mechanism comprising a generally upright sub-lever 14, there being a transverse row of said actuators 13 and a transverse row of said sub-levers 14. All said actuators 13 are normally spring-held clear above a toothed power roll 15 and are adapted to be lowered into motion-receiving intermesh with said power roll, the latter rotating constantly in the direction of the indicated arrow when the machine is in use. Key levers 16 having keys 22, one for every actuator 13, are individually operable to connect the actuators 13 selectively with the power roll 15 for single transistory operations, thereby to cause operations of the type bars 10 selectively. Springs 17, 18 and 20 bias the parts of each type action toward their normal positions shown in Figure 1.

A frame structure of the machine comprises two laterally spaced side walls 23 rigidly connected by a bar 19 which includes a pivot rod for the key levers 16. Said side walls 23 are also rigidly connected by a transverse trackway 24 whereon a carriage 25 is guided for travel in letter-feed and return directions, the said carriage having turnably supported thereon the aforestated platen 11. For carriage guiding cooperation in the trackway 24, the carriage 25 includes a channel bar 26, usual anti-friction elements 27 being provided between the trackway 24 and said channel bar 26. The carriage 25 is constantly urged in letter-feed direction, that is leftwardly, by a spring motor which is indicated at 28 and has a draw-band connection 30 with the carriage 25. However, advance movement of the carriage is subject to the control of a proportional letter-feed mechanism which will be described hereinafter.

Figure 7:
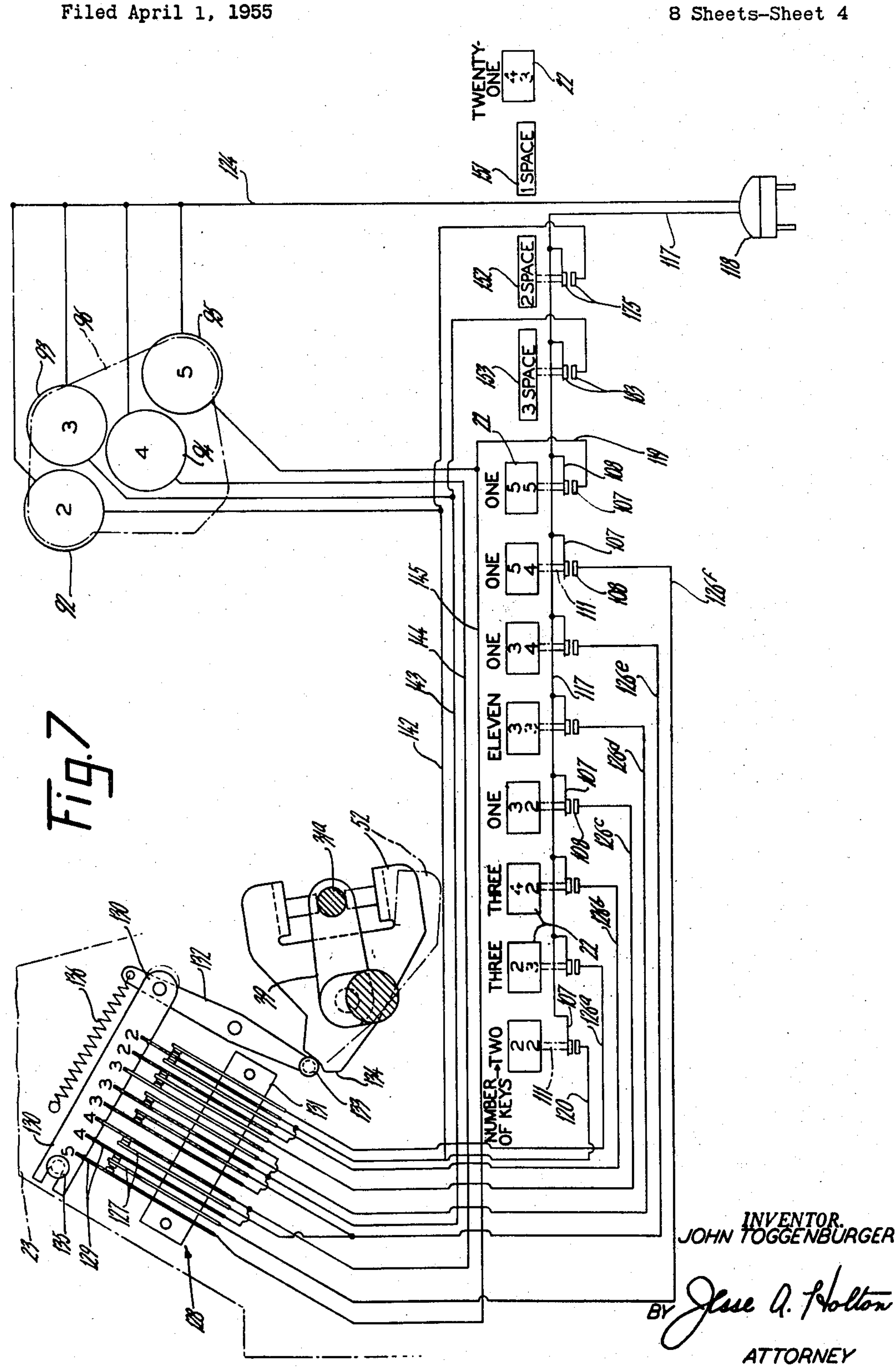
Figure 7 is a diagram of circuitry and related parts whereby electric magnets are controlled.

The type bar segment is normally in a lower case typing position seen in Figure 1, for the lower case types "t" to strike the platen. A case shift body 31 supports said segment 21 for vertical downward shift from said lower case position to an upper case typing position wherein upper case types "T" are adapted to strike the platen. The mechanism for effecting such case shift of said body 31 is fully described in the patent to Helmond, No. 2,275,759, dated March 10, 1942, and includes a case shift key 29 indicated in Figure 8. The case shift body 31 has near each side wall a stud 31$^a$, and a transverse bail 39, indicated in Figure 7, is pivotally supported by the side walls 23 of the machine and associated with said studs to enforce concomitant movement of both ends of the case-shift body. Case shift motion is imparted by a power member, not shown, to a rocker 52 which flanks the right side wall of the machine and straddles the stud 31$^a$ thereat. The full line position of the rocker 52 is the lower case position. The upper case position is indicated by dot-and-dash lines.

Advance travel of the carriage ensues under control of an escapement dog 32 which is normally in engagement with an escapement wheel 33, the latter being unitarily rotatable with a shaft 34 which at its upper end has a pinion 35 meshing with a rack 36 carried fast on the channel bar 26 and extending parallel therealong. The trackway 24 has a boss 37 providing an upper bearing for the shaft 34. A lower bearing for said shaft is provided in a generally horizontal escapement bracket 38 having two spaced, upturned ears 40 for securement by screws to downreaching arms 41 of the trackway 24. The said escapement wheel 33 is in the form of a ring, see Figure 1, and is secured by rivets or otherwise to a companion escapement wheel 42, the latter having a hub 43 pinned fast to the shaft 34. The stated escapement dog 32 is borne pivotally, as at 44, on an arm 45 which is swingable concentrically about a lower end portion of the shaft 34, said arm 45 having a broad pivotal bearing or collar reaching upwardly into the general plane of the wheel 33. The urge of the spring motor 28 tends to turn the escapement wheel 33 constantly in the direction of the arrow seen in Figure 2, and because the escapement dog 32 is normally engaged in the wheel 33, a branch 46 of the supporting arm 45 rests normally limitedly against an abutment 47 afforded by an arm 48. The latter is normally stationary on a pivot stud 50 which in turn is carried fast on the bottom side of the bracket 38.

Letter-feed travel of the carriage is to be substantially proportional to the widths of the imprints in terms of different multiples of a given feed increment. The spacing of the escapement teeth on the wheel 33 is in accord with the stated feed increments, considered however in the aspect of translation of carriage movement into wheel movement.

Incidental to each operation of a type action the carriage 25 is required to advance substantially proportionally to the widths of the characters typed in terms of the said feed increments. To this end, at each operation of a type action, the feed dog 32 is released temporarily from the escapement wheel 33 and under the influence of a spring 55 is caused to take up a new tooth-hold in the wheel an appropriate number of escapement wheel teeth away from the abutment 47 so that the carriage then is controlled to advance the required number of feed increments. As the carriage, following such re-association of the dog 32 with the wheel, turns the escapement wheel 33 counter-clockwise of Figure 2, the arm 45 moves limitedly against the abutment 47.

The lower-case types and upper-case types of almost half the number of type actions, namely twenty-one type actions, call respectively for three-increments and four-increments feed of the carriage. Having reference to Figure 2, there stands clockwise of a finger 56 which is integral with said dog, a stop arm 49 on a pivot stud 57, the said stop arm having two stop-faces 53 and 54. The second digits of the numerals designating these stop faces 53 and 54 signify that such faces are instrumental to effect reengagement of the feed dog 32 respectively for controlling a three and four tooth advance of the wheel 33. The case shift body 31 has control over the arm 49 so that when it is in lower-case position, the said arm 49 has the position seen in Figure 2 wherein the stop face 53 stands in the path of said finger 56. The case shift body 31 controls the position of the stop arm 49 through an element 58 which is pivotally pendant therefrom and has at its lower end a cam 59 resting leftwardly against a pin 51 which projects rearwardly from the crossbar 19 of the machine. A wire link 60 connects said stop arm 49 with the element 58 and the cam 59 rests leftwardly against the pin 51 under the tension of a contractile spring 52 connected to the stop arm 49 and having a leftward and upward bias thereon. In the lower case position of the said body 31 the said element 58, controlled by the said cam 59 resting leftwardly against said pin 51, has the position shown in Figure 6, locating the stop arm 49 so that its stop face 53 is potentially effective, see Figure 2. Whenever the body 31 is shifted downwardly to the upper-case position, the said element 58 is cammed rightwardly and through the link 60 positions the stop arm 49 so that its stop face 54 stands in the path of the dog finger 56.

Figures 2, 3, 4, 5:
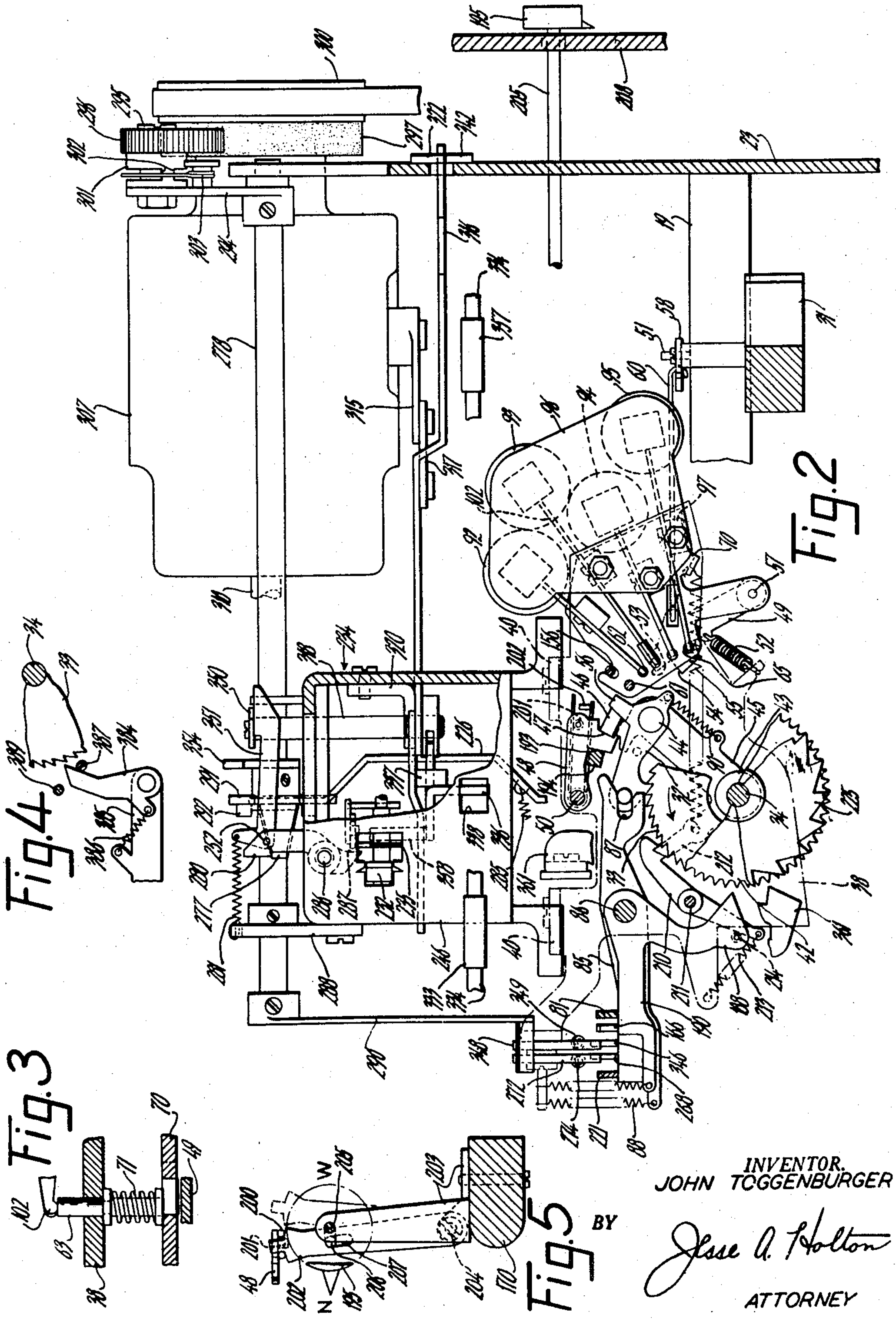
Figure 2 is a fragmentary plan view of some of the mechanism seen in Figure 1.
Figure 3 is a detail view of a space-controlling stop and its manner of support.
Figure 4 is a fragmentary plan view of a single increment back-spacing mechanism.
Figure 5 is a right-hand sectional side view of certain parts of a mechanism whereby the machine can be set for normal or widened proportional spacing.

Normally out of use, clear above the level of the arm branch 46 and the dog finger 56, there are arranged in a row, concentrically about the escapement wheel shaft 34, a series of stop pins numbered 61 to 65, inclusive. The second digits of these numerals 61 to 65 are indicative of the incremental carriage advance which each such pin is adapted to determine by effecting varyingly the re-association of the dog 32 with the escapement wheel 33 after different clockwise movements. The said pins 61 to 65 are guided for vertical movement in the horizontal bracket plate 38 and a plate 70 which is in a parallel plane therebelow, see Figures 6 and 25. The said pins stand normally upwardly restored, out of cooperative range with said dog finger 56, springs 71 being provided on the pins, to act upwardly on collars causing them to bear upwardly against the horizontal plate 38. The lower end of the pin 63 is preferably broadened radially of the escapement shaft 34, as indicated in Figures 2 and 3, so that such pin will always overlie the stop arm 49. The stop pin 65, see Figure 25, is slightly longer than the others and the stop arm 49 bears upwardly thereagainst under the urge of a spring 52. Having specific reference to Figures 24 and 25, it will be noted that the stop arm 49 is formed with top and bottom nodes 73 at opposite sides of the pivot stud 57, which nodes are so arranged that the stop arm 49 is capable of downward swinging displacement flatwise to an idle position indicated by dot-and-dash lines in Figure 25, it being understood that the arm 49 is somewhat loosely pivoted on the stud 57. Any of the pins 61 to 65 when operated is adapted to limit clockwise movement of the escapement dog 32. At operation of any of the pins 63 to 65 the stop arm 49 is pushed downwardly about the general location of the nodes 73 to have no controlling effect on the dog 32. Obviously the link 60 permits freely the stated downward displacement of the stop arm 49.

The several pins 61 to 65 remain in their idle, normal positions whenever any type action is operated which for lower case and upper case typing requires respectively a three and a four increments feed step of the carriage. Therefore, at operations of such type actions, either the stop face 53 or the stop face 54 stands in the path of the dog finger 56, depending on the prevalent case shift position of the case shift body 31. At operations of other type actions which in at least one case shift position of said body 31 require a feed step of a different incremental value, and thus a different clockwise travel of the escapement dog 32, the pins 62 to 65 are selectively operated by electromechanical means in a manner which will be explained later herein.

Figure 6:
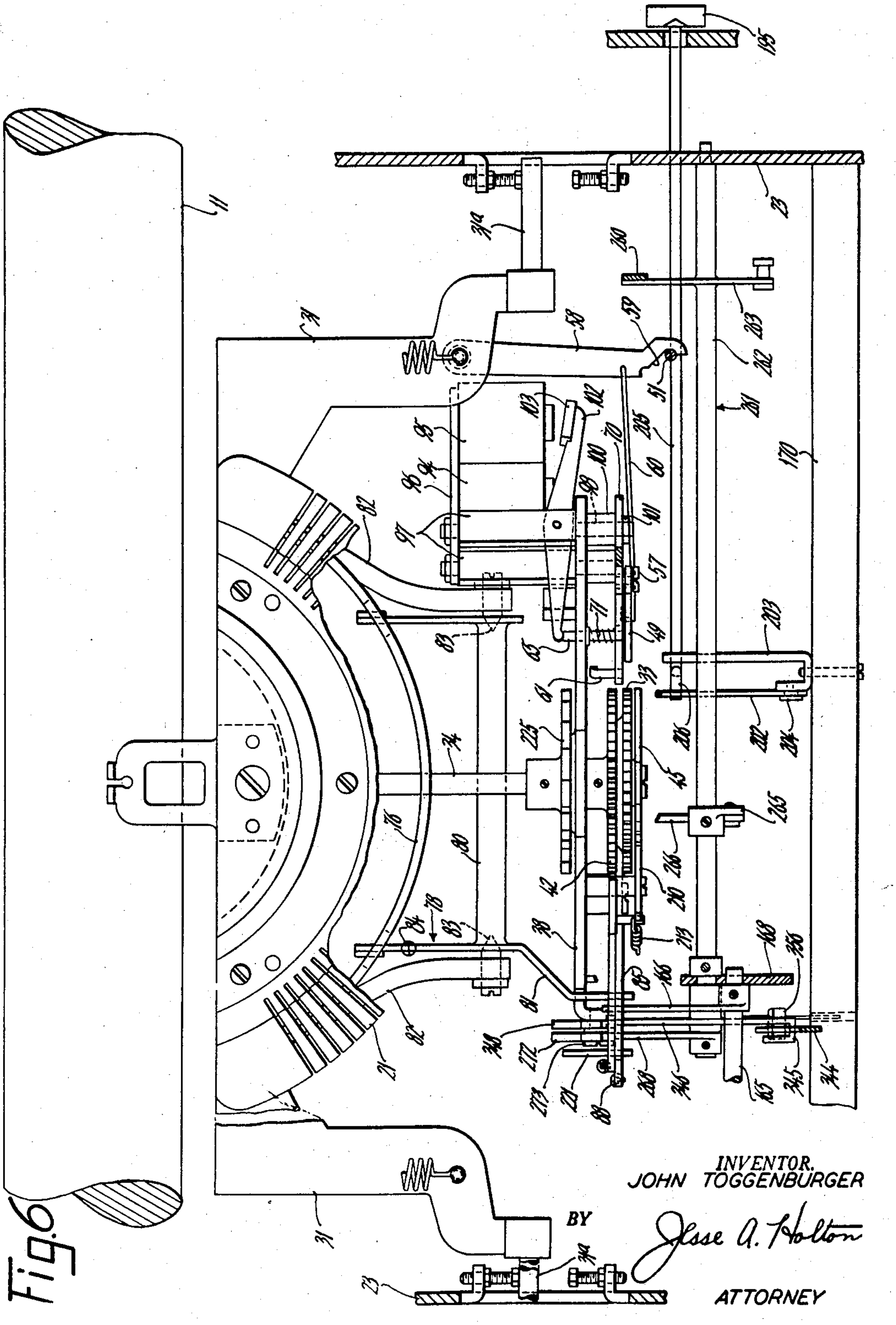
Figure 6 is a front sectional view of the machine.

At the operation of any type action the operated type bar 10 displaces a curved universal bar 76 rearwardly, such universal bar, see Figures 1 and 6, having pivotal connections at 77 with a rocker frame 78, the latter including a short shaft 80 and an arm 81 pendant from such shaft. The rocker frame is pivotally supported, as at 83, on arms 82 which are part of the case shift body 31. The rocker 78, influenced by a spring 84, has normally the position seen in Figure 1. In front of the rocker arm 81 is a lever 85, pivotally borne on a stud 86 which is carried fast on the underside of the escapement bracket plate 38. A right arm of said lever 85 has an open mouth 87 straddling a pin projecting from the dog 32, see Figures 2, 20 and 21. A spring 88 connected to the left arm of the lever 85 is normally instrumental to hold the dog 32 engaged in the escapement wheel 33. At operation of any type action the universal bar 76 is operated rearwardly, causing a forward operation of the pendant rocker arm 81. This rocks the lever 85 counter-clockwise of Figure 2 and turns the dog 32 on the arm 45 to stand clear of the escapement wheel 33, the dog finger moving concomitantly from the arm branch 46. Furthermore, the dog supporting arm 45 being under the constant urge of the spring 55 immediately moves circumferentially of the wheel 33, clockwise until the dog finger 56 rides limitedly into engagement with one of the stop faces 53 or 54, or one of the stop pins 62 to 65. During this clockwise sweep of the dog 32 the pin on the latter rides out of the mouth 87 but the dog 32 is maintained clear of the escapement wheel 33 under the influence of a spring 90, see Figure 2.

If the operated type action is one of the twenty-one which require a three or four increments feed respectively for typing in lower and upper case, then the dog finger 56 will engage either the face 53 or the face 54 on the stop arm 49 depending on whether such type actions are operated with the body 31 in lower case position or upper case position. As the dog finger 56 encounters the face 53 or 54, the dog supporting arm 45 travels farther and this forces the dog 32 about its pivot 44 into mesh with the wheel 33, the dog finger 56 under tension of the spring 55 lying finally solidly between the engaged stop face and the arm branch 46. The stated circumferential movement of the dog 32 and re-engagement with the wheel 33 conditions the dog 32 for measuring out to the carriage the appropriate multiple-increment feed step. Said circumferential movement occurs while the carriage, due to its inertia, stands momentarily stationary. After the inertia of the carriage has been overcome, the wheel 33 under the urge of the spring motor 28 moves counter-clockwise and carries the dog therewith until the abutment 47 intercepts the arm branch 46, the carriage having then reached its required incremental feed position. The teeth of the escapement wheel 33 are slightly undercut and the dog 32 correspondingly formed so that during the feed step the said dog is maintained in engagement despite the disengaging bias of the spring 90. It is to be understood that the operation of the universal bar 76 is momentary and that the lever 85 restores before the carriage completes its letter-feed step, wherefore the dog pin will enter appropriately the mouth 87 in the lever 85. The lever 85 under the tension of the spring 88 is then effective to maintain the dog 32 engaged.

The several stop pins 62 to 65 inclusive are operable severally by electromagnets 92 to 95, inclusive, see Figures 2, 6 and 7. Said electromagnets are suitably supported by a plate 96 which is fastened upon a series of studs 97, the latter projecting upwardly from the escapement bracket 38 and being of rectangular cross-section. Said studs 97 have reduced screw portions 98 extending through the escapement bracket 38 and the underlying plate 70. On the said screw portions 98, between the plate 70 and the escapement bracket 38, there are spacers 100. Nuts 101 on said screw portions hold the studs, the plate 70 and the escapement bracket 38 rigidly united as shown in Figure 6. The several studs 97 have each on one side pivotally supported thereon a lever 102 comprising an arm having an armature 103 for attraction by the core of the related magnet. Each lever 102 comprises another arm overlying a related stop pin 62, 63, 64 or 65. Any of the several magnets, when energized, will attract its related armature and thus will operate its associated lever 102 and thereby set its related stop pin.

Such of the type actions which either for lower case or upper case typing require a feed-step different from that obtainable under control of the stop arm 49 are adapted in their actuation to effect closure of a related pair of contacts 107 and 108, see Figures 1 and 7. Such type actions have each a wire link 110 articulated with a downwardly and rearwardly reaching arm of the sub-lever 14. Each of said links 110 is downreaching between the key levers 16 and therebelow is pivotally connected to an arm 111 which has pivotal support on an ear 112, the latter being bent rearwardly from a comb plate 113 guiding the key levers 16. The said arms 111 have washers 114 of insulating material for individually actuating the contacts 107 upwardly. The type bars 10 commence to operate the curved universal bar 76 approximately when they reach the dot-and-dash position indicated in Figure 1. The said washers 114 stand normally well below the contacts 107 and effect contact closure about when the type bars 10 reach the stated dot-and-dash position.

Referring now to the electrical diagram of Figure 1, there are shown a series of the type keys 22 which severally are representative of different type actions. The type key 22 shown at the extreme right in said figure, represents one of the twenty-one type actions which in their operations do no involve the magnets 92 to 95. The lower and upper numbers on these keys signify that respectively in the lower and upper case position an operation of one of these keys will result in the incremental feed indicated respectively by the lower and the upper numbers. The other type keys 22 in the said diagram have noted thereon lower and upper numbers indicative of the incremental value of the letter-feed steps which result respectively at the lower and the upper case typing operations thereof. It will be noted that the numbers on these type keys are of differing combinations and at least one of the numbers disagrees with respect to the rightmost illustrated type key 22. Below each of the keys 22, except the rightmost illustrated one, there is a diagrammatic representation of a pair of the stated contacts 107, 108. The aforedescribed type-action-operable arms 111 are indicated in dot-and-dash lines. The written notations above the keys show how many of each of said keys calling for the same letter-feed control are present in the machine. Of course, the requirements vary in accord with the particular type font embodied in the machine. In reference to the numbers noted on the type keys 22, those which are in solid lines signify that an electromagnet is involved for letter-feed control, and those which are in dotted lines signify no involvement of an electromagnet. The type action controlled by the key 22 which has two "2" notations above each other will, responsive to any operation of such key, by closure of its related contacts 107, 108, always close a circuit for the magnet 92. This is whether typing occurs in lower or upper case. The circuit so closed comprises a lead 117 from a current supply plug 118 to the contact 107 of the pertinent type action, and a lead 120 from the related contact 108, merging with a lead 142 to the magnet 92. The magnets 92 to 95 have a common lead 124 to the current supply plug 118.

The type action controlled by the key 22 which has two "5" notations will, responsive to any operation of such key, close its related contacts 107, 108 and thereby will always complete a circuit for the magnet 95. Such circuit comprises the lead 117 from the plug 118 to the contact 108 of such type action, and further a lead 119 from the related contact 107 merging with a lead 145 of the magnet 95.

From the contacts 107 associated with the other keys 22 there extend parallel circuit leads $126^a$ to $126^f$, inclusive, variously to switch fingers 127. Said switch fingers comprise part of a case-shift controlled electrical switching means generally designated by the numeral 128 and including other switch fingers 129 interspersed with the switch fingers 127. The switch fingers 129 are longer and reach into notches provided in a link 130 of insulating material. The switch fingers 127 and 129 are mounted insulated from each other in an insulating block 131 which is carried fast on the left side wall 23 of the machine. A lever 132 having a follower roll 133 bearing on a two-step cam formation 134 provided on the case-shift rocker 52, controls the position of the link 130 so that in the lower case position of the case-shift body 31 it has the full-line position, and so that in the upper case position of said body it has the position indicated in dot-and-dash lines, flexing the contact fingers 129. One end of the link 130 is slotted for sliding support on a pin 135 that projects from the side wall 23. A strong spring 136 causes the roll 133 to bear on the cam 134.

The circuitry is such that in the lower-case state of the switching means 128 certain of said fingers 127 have contact with certain of the fingers 129 so that the leads $126^b$ and $126^c$ are normally in circuit with the lead 142 to the magnet 92, and also so that leads $126^e$ and $126^f$ are normally in circuit with the lead 144 to the magnet 94. When the switching means 128 is in the upper-case state, then certain of the fingers 127 have contact with certain fingers 129 so that the following conditions prevail: The lead $126^a$ is in circuit with the lead 142 for the magnet 92, the leads $126^c$, $126^d$ and $126^e$ are in circuit with the lead 143 for the magnet 93, and the lead $126^f$ is in circuit with the lead 145 for the magnet 95. It is thus evident that at the operations of the various type keys 22 the appropriate stopping conditions are established for limiting the clockwise circumferential movement of the feed dog 32 in accord with the feed step that is required to ensue, and this is true whether typing is done in lower or upper case. The contacts 107, 108 are of lightly flexible material and offer thus very little resistance to the operations of the type actions, and over a small operating range, so that the imprint force of the type bars is practically unaffected. This is highly important, particularly also because the machine includes a usual settable mechanism, not shown, universal to the type actions, for varying the strength of imprints, and if the contacts 107, 108 were a strong impeding influence, such influence would have a disproportionate effect for different settings of such mechanism.

The contacts 107, 108 open early in the return of each operated type bar so that new stop pin selections can occur in quick succession. Obviously, the wiring may include spark-suppressing condensers, but such have not been shown. While magnets are preferably used the term should be interpreted to be embracive of solenoids.

The contacts 107 may be stamped from a single piece of sheet metal and mounted along with the individual contacts 108 within a housing comprising an inverted channel member 148 and a bottom cover 149, the latter secured by screws 150 to studs 151 in the member 148. The operating arms 111 for the contacts reach into the stated housing through vertical guide slots 152 provided in the member 148, the entire arrangement being such that the contacts 107 and 108 are well shielded against dust. The housing 148, 149 is generally co-extensive with the spread of the key-levers 16 and is suitably attached at each end to the side walls 23 of the machine.

Figure 8:
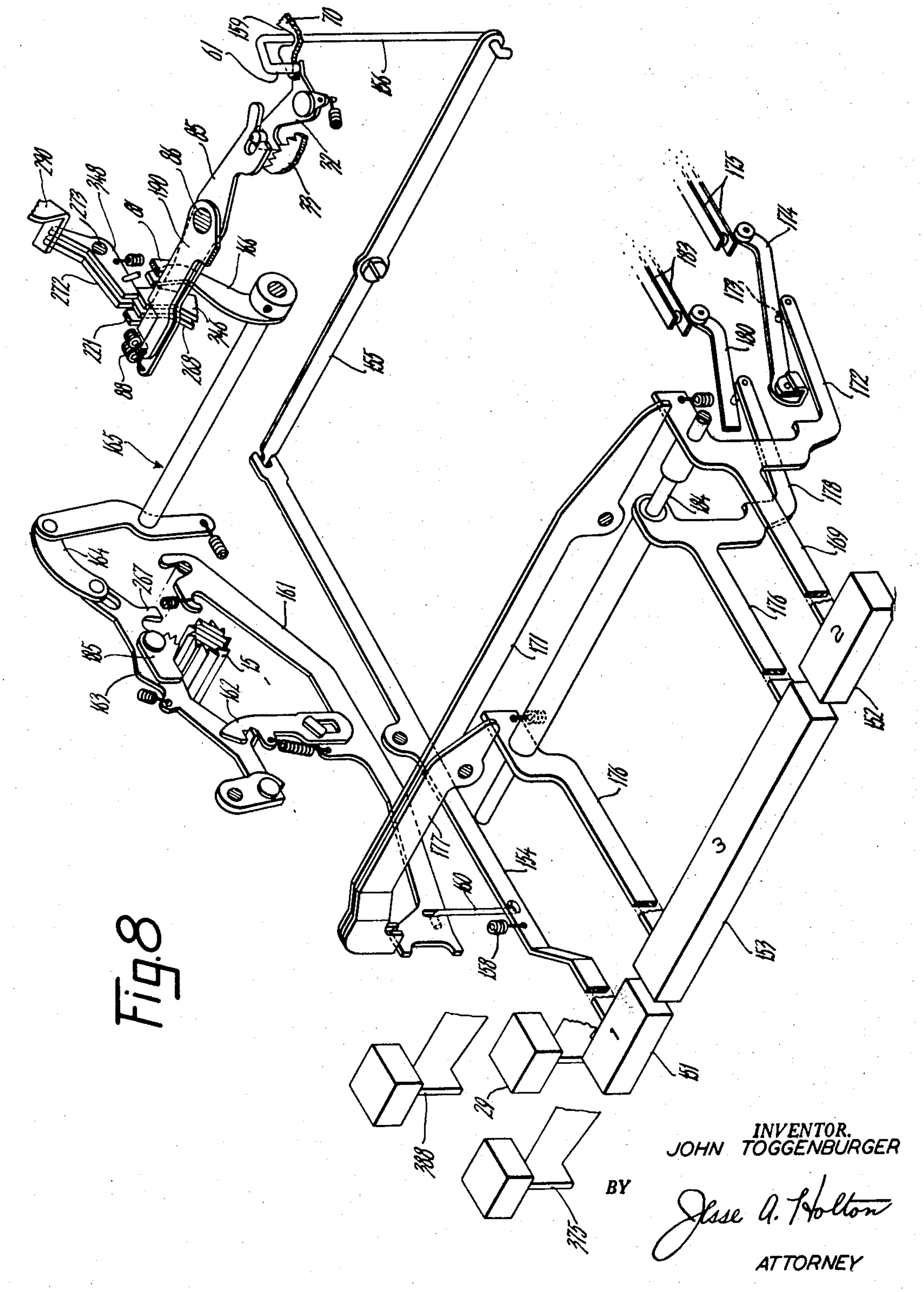
Figure 8 is a right-hand front perspective view illustrating several space keys with associated mechanism.

In Figure 8 there are shown three space bars 151, 152 and 153 respectively to cause the machine to space one, two and three increments. The space bar 151 is on a lever 154 and at the rear has an articulation with a transverse lever 155. The latter lever 155 has at its right end an upreaching wire link 156 which at the top has a reversing bend to include the aforedescribed stop pin 61. To prevent the link 156 from turning it is nested in an open slot 159 provided in the plate 70. A spring 158 urges the lever 154 to its normal position seen in Figure 8. This locates the stop pin 61 above the swinging range of the escapement dog 32. At the operation of the space bar 151 the stop pin 61 moves downwardly into stopping range of said dog 32. The lever 161 has a hook 162 for drawing a space actuator 163 into operation-receiving relation with the constantly driven power roll 15. Thus, at operation of the space key 151 there ensues a forward movement of the actuator 163 which in turn, through a link 164, rocks a bail 165, the latter including an arm 166 whereby it acts on the dog operating lever 85. The shaft of the bail is pivotally supported at its left end in the left side wall 23 and, as seen in Figure 6, has pivotal support at its right end in a bracket 168 which in a manner not shown is carried fast on a crossbar 170 of the machine. When the space bar 151 is operated, the stop pin 61 is projected and the escapement dog 32 is momentarily operated clear of the escapement wheel 33 and moves from the abutment 47 to be re-engaged again by the stop pin 61 with the escapement wheel 33 one tooth beyond the last engagement and to measure out to the carriage a single increment step. Thereafter the parts are again in the position seen in Figure 2. The actuator 163 has a nose 167 which rides into engagement with the power roll 15 and whereby the actuator is disconnected. The arrangement is such that the operation of the actuator is very momentary, wherefore the dog operating lever 85 restores immediately after operation.

The space bar 152 is on a lever 169 which by a transverse lever 171 is in communication with the lever 161 for effecting connection of the actuator 163 with the power roll 15. Said lever 169 includes a branch 172 having a pin 173 to act upwardly on an arm 174 for closing a pair of contacts 175. Having reference to Figure 7, it will be seen that actuation of the key 152 establishes a closed circuit for the magnet 92, causing the projection of the stop pin 62. Since the key 152 also calls the space actuator 163 into operation, it follows that a two-increments space is resultant.

The space bar 153, being the one most frequently used, is extra long, and comprises a rockable unit consisting of two spaced arms 176. The left arm 176, through a lever 177, is adapted to operate the actuator engaging lever 161. The right arm 176 includes a branch 178 for upward operation on an arm 180. A pair of contacts 183 are closeable by said arm 180 to close the circuit for the magnet 93. Obviously, the key 153, when operated, produces a three-increments space of the carriage.

The keys 152 and 153 are pivotally supported on a common shaft 184 extending transversely of the machine. In connection with the said space keys it is to be observed that the stop pins 61, 62 and 63 become selected slightly in advance of the operation of the escapement operating arm 85. This is because the space actuator 163 includes a snatch pawl 185 which has capacity on the actuator 163 for some initial idle movement.

If the carriage is to execute steps of appropriate incremental value, then the escapement wheel 33 must be at least momentarily come to rest before the escapement dog 32 is again released to move clockwise to take up a new tooth-hold in the escapement wheel. Ordinarily, the carriage 25 completes its letter-feed step, that is the dog 32 arrests the escapement wheel 33 in ample time, so that the static inertia of the carriage causes the escapement wheel 33 to stand still while the escapement dog 32 moves clockwise and takes up its new tooth-hold in the wheel. However, this cannot be relied upon if one typing stroke succeeds so closely another that the carriage has not completed fully its first feed-step when the feed-dog 32 resultant to the second typing stroke moves again free of the escapement wheel. In such case the carriage and the escapement wheel 33 would continue movement as the dog 32 moves clockwise to take up its new tooth-hold. Consequently the carriage would be temporarily out of control and there would result an excessive carriage movement. To guard against this, and yet not to impede unduly the carriage in its stepping movements, there is provided a secondary escapement dog 188 for co-action with the escapement wheel 42 which is companion to and unitary with the escapement wheel 33. The escapement dog 188 is pivotally carried on the stud 86, above the lever 85, and is normally clear of the escapement wheel 42. At each typing operation the arm 81 which operates the lever 85 to disengage the feed-dog 32 also operates an arm 190 which is integral with the dog 188, moving the latter between two teeth of the escapement wheel 42, see Figure 26. Specifically, a face 191 on the dog 188 moves to stand momentarily in the way of a tooth on the wheel 42 as seen in Figure 26, assuring the halting of the wheel and the carriage long enough for the feed dog to take up its new position in the wheel, the angle at which the dog face 191 engages a wheel tooth being such that the tendency of the wheel to advance under the tension of the carriage spring motor 28 has a camming influence favoring the restoration of the dog 188. If the dog 188 were associated with the escapement wheel 33 having the slightly undercut teeth, the carriage would be slow in getting under way in each feed step. The described feature lends reliability of operation to the proportional spacing mechanism without detrimentally affecting its capability for high-speed of operation. A light restoring spring is associated with the dog arm 190.

Incidental to the operations of the space bars 151, 152 or 153 the lever 85 and the dog 188 are operated by the arm 166 and of course the escapement operation is equally reliable and speedy.

It is one of the features of the invention to set the machine for widened spacing at the will of the operator. In Figure 2 the supporting arm 45 for the escapement dog 32 has its branch 46 limitedly resting against the abutment 47 of the abutment arm 48. The said arm 48 and abutment comprise part of an abutment means which also includes a second abutment 193 afforded by a stud 194 which projects rigidly from the escapement bracket 38 downwardly. Means are provided whereby the abutment arm 48 is adapted to be given either the position seen in Figure 2 or the position seen in Figure 21. In the latter position of the said arm 48, the dog supporting arm 45 has capacity for greater step-movement with the escapement wheel 33, namely it can move one escapement wheel tooth farther, at which time it limitedly engages the secondary abutment 193. The throat 87 in the pawl operating lever 85 is accommodating this greater step movement as is illustrated in Figure 21, wherein the pin on the dog has entered a narrowed portion of the throat. Settable means, including a control knob 195, is provided to effect the movement of said abutment arm 48 from either one of the two positions seen in Figures 2 and 21 to the other position. Said settable means, however, at each new setting given thereto has effect on the arm 48 only resultant to the feed-dog moving from the engaged abutment 47 or 193. At the time it is desired to effect a change in the condition of the abutment means for future effectiveness of the abutment 47 or the abutment 193, the extension 46 of the arm 45 is of course engaged with the abutment 47 or the abutment 193, and so as not to alter the position of the carriage, the prevalent condition of the abutment means 47, 193 must be maintained until in the next escapement operation the dog 32 moves from the abutment 47 or 193 that happens to be engaged.

From Figure 2 it will be noted that if the extension 46 of the dog supporting arm bears with pressure against the abutment 47, the arm 48 is thereby held against swinging movement to the position seen in Figure 21. To further insure against such swinging movement of the arm 48, a tooth 196 on the latter, see Figure 2, is adapted to lie in a notch of the said extension 46. If the abutment arm 48 has the position seen in Figure 21, the stated extension 46 lying against the stationary abutment 193 blocks said arm against movement to the Figure 2 position.

A mechanism is adapted to be given one condition to place said abutment arm 48 under an urge to move from said Figure 2 position to the Figure 21 position, said urge, however, having effect only incidental to the first escapement operation following such conditioning, that is when the stated extension 46 moves from the abutment 47. The same mechanism is adapted to be given another condition to place said abutment arm 48 under an urge to move from said Figure 21 position to the Figure 2 position, such urge having effect only incidental to the first escapement operation following thereafter, that is when the extension 46 moves away from the abutment 193. The said mechanism comprises a torsion spring 200 carried on the stud 50 and having two legs straddling a pin 201 projecting downwardly from the abutment arm 48. The two legs of said spring 200 straddle also the upper-end portion of an arm 202 which is pivotally carried at 204 on a bracket 203 fastened upon the crossbar 170, see Figures 5 and 6. In Figure 5 which is a right-hand side view, the arm 202 is shown in the forwardly swung position contacting with the front leg of the spring 200 so that the rear leg bears with tension forwardly on the pin 201 of the abutment arm 48. The said arm 202, see Figure 6, is adapted to be held in the Figure 5 position under the control of the knob 195 which is provided on the right end of a shaft 205, such shaft at its left end being bent to form a crank pin 206 and the latter extending into a slot 207 of the arm 202. Near its left end the said shaft 205 is pivotally supported in the bracket 203 and at the other end it has pivotal support in the right end side wall 23 of the machine.

The shaft 205 extends through a clearance hole in an outer shell 208 of the machine. By turning the shaft 205 counter-clockwise of Figure 5, by the knob 195, the said arm 202 is moved to the indicated dot-and-dash position. In such movement of the arm 202 the rear leg of the spring 200 is moved to the position seen in Figure 20 and consequently the abutment arm 48 is under a rearward urge of the front leg of said spring. At the time the said arm 202 is so moved rearwardly the abutment arm 48 is detained as shown in Figure 20 by the extension 46 of the dog supporting arm 45. The front leg of the spring 200 therefore is prevented from moving the abutment arm 48 rearwardly until a typing or spacing operation causes the clockwise movement of the dog supporting arm 45. When this happens, the abutment arm 48 snaps rearwardly to the position seen in Figure 21.

When the said arm 202 is moved from the position of Figure 21 to the forward position of Figure 5, the rear leg of the spring 200 will conversely bear forwardly on the abutment arm 48, but will be able to position it in its forward, limiting position only after the extension 46 of the dog supporting arm 45 in the next escapement operation moves clockwise beyond the abutment arm 48.

The machine includes a provision for detaining the dog supporting arm 45 upon its movement against either of the abutments 47 and 193. Such provision is very important for placing the carriage under uniform conditions under control of the escapement at the termination of tabulations, carriage returns and back spacing operations. It facilitates also manual positioning of the carriage under uniform conditions, accurately and with greatest ease, as will be evident hereinafter. The said holding provision is effective at the conclusion of each escapement operation until the next escapement operation is instituted. The stated holding provision, see Figure 2, comprises a pawl lever 210 having two ratchet teeth and being pivotally supported on a stud 211 projecting downwardly from the escapement bracket 38. An arm 212 integral with the dog supporting arm 45 cooperates with the teeth of said pawl lever 210 so that normally the pawl supporting arm 45 is held against clockwise movement from either of said abutments 47 or 193. The said pawl lever 210, under the constant urge of a spring 213, tends to move to effective position.

At every operation of the dog releasing lever 85 effected by the arms 81 or 166, the secondary escapement dog 188 is swung momentarily into controlling engagement with the escapement wheel 42. Said secondary dog 188 has a pin 214 whereagainst the pawl lever 210 is adapted to lie under the tension of the spring 213. Operation of the secondary dog 188, as illustrated in Figure 26, releases the pawl lever 210 from the arm 212, so that the escapement dog 32 which has been disengaged concomitantly, will move clockwise to take up its new tooth-hold. The operation of the pawl lever 210 is very momentary and as the escapement dog in its new tooth-hold moves counter-clockwise to the limit of either the abutment 47 or the abutment 193, the arm 212 is again caught by one or the other of the ratchet teeth of the pawl lever 210. Thus the pivot 44 of the escapement dog 32 is normally substantially stationary.

To facilitate ready positioning of the carriage 25 manually at will and in different incremental positions, leftwardly or rightwardly, the carriage includes thereon, see Figure 1, a bail structure comprising a bail bar 215 coextensive and parallel with the carriage. The bail structure further comprises at each opposite end of the carriage an arm 216, such arms having a rock shaft 217 extending therebetween and having pivotal support in the carriage ends. Each of the arms 216 includes an operating finger piece, not shown, and the bail structure, under the urge of a spring 218, has normally the position seen in Figure 1. Substantially in the middle of the machine there is arranged an arm 220 for operation by the bail bar 215 regardless of the position the carriage may occupy. Said arm 220 is fast on a short shaft 219 which has pivotal support in a housing that supports portions of a tabulating mechanism. On said shaft 219, a distance leftwardly of the arm 220, there is a downreaching arm 221, a lower portion of which is shown in Figures 2 and 6. Whenever the carriage supported bail 215 is operated it results in a pivotal displacement of the arms 220 and 221. This through action of the arm 221 on the lever 85 will release the escapement dog 32, but not the supplementary dog 188. Therefore the escapement dog 32, although released, is prevented under control of the pawl 210 from moving circumferentially. With bail 215 maintained actuated, the carriage can then be freely located as required, the escapement dog 32 taking immediate and accurate incremental control over the carriage as the bail 215 is permitted to restore. In other words, the carriage settles with less than one increment advance movement when the escapement dog 32 is restored, and this is true whether the machine is set for normal or widened spacing. Of course, also when the carriage is relocated by a push in return direction, the carriage settles also with less than a single increment advance.

A number of special problems arise in connection with providing an efficient, accurately functioning tabulating mechanism in machines embodying proportional letter-spacing mechanism. One difficulty arises in view of the rebound of the carriage incidental to its tabulating arrest coupled with the requirement to bring the carriage accurately to rest in a definite incremental feed position.

The machine, see Figures 1, 2, 22 and 23, embodies a member or wheel 225, which is fast on the escapement wheel shaft 34 and has teeth at intervals corresponding to three teeth of the escapement wheel 33. A stop slide 226 stands normally clear of the coarsely-toothed wheel 225. When the carriage is tabulated and approaches a position whereat the tabulating run is to be terminated, the said slide 226 is automatically caused to move into engagement with said wheel 225 to intercept it by co-action with one of its teeth.

The carriage may embody a bar 227, see Figure 12, extending lengthwise thereon and having key-settable, tabulation-terminating elements 228 or stops arranged in a row therealong, the arrangement being substantially as disclosed in the patent to Helmond No. 2,278,010, dated March 31, 1942. One of said elements 228, including fragments of the stated bar 227, is indicated also in Figure 1. The spacing of said elements 228 agrees with the spacing of the coarse teeth on the wheel 225, namely said elements are spaced at triple-feed increments. The control elements 228 are individually settable in the manner generally disclosed in said Patent No. 2,278,010, downwardly on the bar 227 to tabulation controlling positions, two of the elements 228 being shown set in Figure 12. In a manner hereinafter to be explained, any of the elements 228 may be brought into registration with a narrow setter 230 to be set by downward actuation of the latter, the machine having in the keyboard of the machine a set key, not shown, and said setter 230 being responsive to said set key. Directly below the setter 230, is a restorer 231 of conventional construction, and including a cam face 232. The said restorer is operable upwardly under key control, not shown, to restore any set element 228 situated directly thereabove. Moreover, when said restorer is operated, the cam face 232 will restore any element which by rightward carriage movement is riding upwardly thereon.

Within the tabulator housing 234 there is an element 235 projectable from an idle lower position seen in Figure 12, upwardly to stand in cooperative range with said control elements 228. Said projectable element 235 is in the form of a generally vertical reed which near its lower end is guided in a slot of a plate 236 which is fast in the housing 234. Said projectable element 235 has near the upper end a slot 237, see Figure 1, through which there extends a guide stud 238, the latter having support in the opposite side walls of the housing 234. An ear 240, integral with the reed or element 235, affords a saddle 241 for a pin 242 on an arm 243. The right end of the arm 243 has an open slot whereby it is pivotally seated on a stud 244, there being a spring 245 connected to said arm to keep it normally rightwardly urged to the limit of the stated slot, as well as downwardly about the pivot stud 244. Said stud is fast on a projection downreaching from the top plate 246 of the housing 234. The pin 242 bears down in the saddle 241 so that said projectable element 235 has normally the position seen in Figure 12, wherein a stop lug 247 thereon rests on the plate 236. Said pin 242, by bearing down under the influence of the spring 245, will settle to the lowest point in the saddle 241 and thereby will give normally the upper end of said element 235 the lateral position seen in Figure 12.

At operation of a tabulator key 248, see Figure 1, a link 250 is power raised by a mechanism later herein to be described. Said link, near its lower end, has guidance in a slot of the plate 236 and at its upper end has an open slot 251 straddling a reduced portion of the stud 238. A stop lug 252 of said link rests normally upon the plate 236. The top end of said reed underlies a shoulder 253 of the arm 243 with slight clearance. A spring 254 inferior to the spring 245 extends with tension between the element 235 and the reed 250. When the link 250 is operated, it displaces the arm 243 upwardly, as is evident from Figures 13 or 14, and the element 235 will readily follow under the urge of the spring 254, as directed by the pin 242 resting deep in the saddle, provided, however, that no tabulation controlling element 228 happens to stand in its path.

Due to the fact that the position of the carriage is variant in accord with the stated small feed increments, a tabulating control element 228 may make it infeasible for the element 235 to move straight upwardly, that is the element 235 may clash with a set element 228. In such event, the light spring 254 allows the element 235 to be temporarily held up. While the operation of said arm 235 progresses, the pin 242 on the arm rises from the bottom portion of the saddle 241 so that the element 235 can glide into position either leftwardly, as in Figure 13, or rightwardly as in Figure 14. The top of the projectable element 235 has a sharp edge and also the lower ends of the settable elements 228 are sharp-edged. This gives the projectable element 235 a better opportunity to guide upwardly into position. In the stated operation the said element 235 is urged upwardly by the light spring 254 and is unable to restore any set element 228 with which it may clash, it being understood that usual detent springs hold said elements either in idle or set positions.

Figures 9, 10:
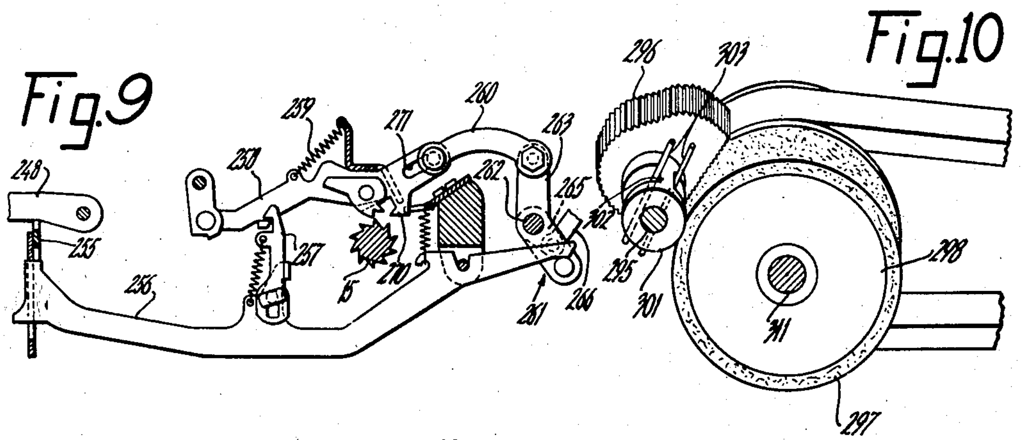
Figure 9 is a right-hand sectional side view illustrating a power actuating device for the tabulating mechanism.
Figure 10 is a fragmentary perspective view depicting a wheel and a cam-roll connectable thereto to receive single turns.

The upward actuation of the link 250 is effected in response to the tabulator key 248 by a mechanism which is fully disclosed in the patent to Helmond No. 2,303,878, dated December 1, 1942. Said key 248, by downward action on a transverse lever indicated at 255, depresses a lever 256 which by a hook 257 will lower an actuator 258 into motion-receiving relation with the constantly turning power roll 15, see Figure 9. Said actuator 258 consequently receives a power stroke, imparting thereby, by means of a link 260, a swinging motion to a rocking assembly 261 comprising an arm 263 and a shaft 262, said swinging motion, considered in reference to Figures 1 and 9, being counter-clockwise. The shaft 262 extends transversely of the machine as shown in Figure 6, and has pivotal support in the bracket 168 and in the right side wall 23. At the middle of the machine the shaft 262 has an arm 265 which through a link 266 is connected to a lever 267, the latter having connected thereto the lower end of the link 250. Near the left end the said shaft 262 has fast thereon an upreaching arm 268 for action on the dog operating lever 85.

By the described mechanism there results in response to an operation of the tabulator key 248 an upward displacement of the link 250 to cause the resilient projection of the element 235. Concomitantly also a release of the escapement dog 32 is effected to free the carriage for tabulating travel.

The stated actuator 258 is divorced automatically as said rocking structure 261 reaches operated position, it having a tail 270 riding into the power roll 15 whereby the power roll will then force it out of engagement for immediate return to restored position by a spring 259, independently of the rocking assembly 261, the actuator having a slot 271 permitting this. On the other hand the rocking assembly 261 inclusive of the arms 266 and 268, is automatically detained in operated position through a latch 272 which automatically snaps into position behind the arm 268. The said latch 272 has pivotal support on a stud 273 projecting laterally from a vertical ear of the escapement bracket 38. A spring 274, see Figure 2, has a constant bias to move the latch to effective position downwardly behind the arm 268. However, normally the said latch 272 lies with tension upon the top end of the arm 268.

The stop slide 226, see Figures 1, 22, and 23, has an articulation at its rear end with an upright lever 277 which is pivotally carried on a rock shaft 278. A part of the lever 277 which extends above the rock shaft 278 has associated therewith a latch 280 which under the urge of a spring 281, see Figure 2, is normally in position to hold said lever against movement clockwise of Figure 1 by a strong spring 282. The lever 277, so held, causes the stop slide 226 to stand normally clear of the coarsely toothed wheel 225. From Figures 1 and 18 it can be seen that the end of the stop slide 226 adjacent to the wheel 225 is situated in a rectangular hole afforded by a block 283 having a wide notch 284 at its bottom side and being fastened upon the escapement bracket 38. A spring 285 urges the stop slide 226 against the left side of the notch 284.

The stated latch 280 has pivotal support at 286 on the underside of the housing top plate 246, and includes a face 287 standing normally slightly to the left of the projectable element 235, see Figures 2 and 12.

The tabulating movement of the carriage which ensues resultant to the operation of the tabulator key 248 is terminated automatically in response to any control element 228 riding in its tabulating advance against the projected element 235 and displacing it slightly about its lower end. Said element 235, in being so displaced, acts on the face 287 to swing the latch 280 free of the lever 277. Said lever 277 under the tension of the spring 282 moves immediately to snap the stop slide 226 into engagement with the coarsely toothed wheel 225. The face 287 of the latch arm 280 is so correlated with the projectable element 235 that the release of the latch 280 occurs always just after one of the leading edges of the teeth on a wheel 225 passes the stop edge of the slide 226. In other words the stop slide 226 snaps into position approximately when the wheel teeth have a relation thereto as seen in Figure 18. Because of this the stop slide 226 has ample time to move reliably into position to intercept the next tooth of the wheel 225. In effecting the arrest of the wheel 225 the stop slide reacts against the left side of the notch 284 and there ensues momentarily a rebounding movement of the carriage and the wheel 42 in which the stop slide 226 may be carried along by the wheel 225 until it contacts against the right side of the notch 284. If the rebound is in excess of the said notch 284 then the back side of the wheel tooth against which the slide 226 lies glides therealong a little further but insufficiently for said stop slide to lose control over the wheel 225, the latter settling after a short time interval, accurately defined by the slide 226 resting against the left side of the notch 284.

The projected element 235, after effecting the release of the latch 280, is moved a little farther by the element 228 and, before the stop slide 226 intercepts the wheel 225, the right edge of the saddle 241 carries the arm 243 slightly rightwardly for the shoulder 253 of the arm 243 to ride off the top end of the link 250. This causes the immediate restoration of the projectable element 235 to normal position by the arm 243 which is under the strong downward bias of the spring 245.

It will be noted that neither the projectable element 235 nor the control element 228 riding thereagainst takes the blow of the tabulating carriage and consequently these parts, as well as also the bar 227, can be of very light construction. Obviously the wheel 225 can be of ample strength and if desired the block 283 may be cushioned to reduce noise.

The upper end of the link 250 is adjustable with respect to the shoulder 253, parallel to the carriage, by screwing the guide stud 238 in the housing 234 to different positions, it being noted that said guide stud has a shoulder against which the link 250 bears under the influence of the spring 254. This allows the restoration of the projectable element 235 to be timed to occur after the release of the latch 280 and before the arrest of the carriage.

The shaft 278 which pivotally supports the lever 277, has pivotal support at one end in the right side wall 23 of the machine and at the other end in a plate 288 secured to the left side of the housing 246, see Figure 2. At its left end said shaft 278 has fast thereon an arm 290 which with some clearance normally overlies a finger of the latch 272, see Figure 1. Said shaft 278 has also fast thereon a downreaching arm 291 having two pins 292 straddling the lower arm of the lever 277, a spring 293 attached to the arm 291 causing it to have normally the position seen in Figure 1 wherein the rear pin 292 lies forwardly against the lever 277. The shaft 278 has a further arm 294 near its right end whereon there is turnably supported on a stud 295, a cam roll 296. The said cam roll is associated with a tire 297 of rubber or other resilient material provided on a wheel 298 which continually turns with a pulley 300 of a belt drive for the power roll 15, the direction of rotation being indicated in Figure 1 by an arrow. The cam roll 296 has a hub 301 provided with opposite flats 302. A spring 303 has two legs tensioned toward each other in said flats to detent normally the cam roll 296 to have the position seen in Figure 1. The said spring 303 includes a few turns surrounding a supporting pin 304 and tensioning said legs toward each other. The cam roll 296 stands normally lifted off the tire 297 in the position seen in Figure 1.

Whenever at the conclusion of the tabulating movement of the carriage the lever 277 is spring actuated in response to the operation of the latch 280, the arm 291 will follow under the tension of the spring 293, whereby the arm 294 brings the cam roll 296 into pressure contact with the tire 297. The said cam roll 296 has preferably a serrated periphery. Upon contact with the tire cam roll 296 will be driven thereby to execute a single turn. During a first quarter of this turn a concentric portion of the cam rides on the tire 297, and nothing significant happens. During a second quarter turn an eccentric portion of the said cam causes the arm 294 to swing counter-clockwise of Figure 22 and the arm 290 actuates the latch 272. This operation is shown in progress in Figure 22, wherein the latch 272 is on the point of release for freeing the arm 268 of the rocking assembly 261. Therefore, the dog controlling lever 85 will restore the escapement dog 32 at the next moment to gain control over the carriage. During the rotation of the cam 296 to the Figure 22 position, the carriage has ample time to rebound and come fully and accurately to rest against the stop slide 226. Continuing to turn the cam will displace the arm 294 counter-clockwise beyond the Figure 22 position, and when the crest of the cam 296 rides on the tire the arm 291 by its front pin 292 will have restored the lever 277 slightly beyond the normal position, the latch 280 springing to effective position for holding the lever 277. The stop slide 226 consequently will have moved clear of the coarsely toothed wheel 225 and will be held thereat. As soon as said stop 226 has so moved clear, the carriage will move slightly taking up free play between the escapement dog 32 and the escapement wheel 33. It is to be remembered here that during the tabulation the one or the other tooth on the pawl 210 holds the supporting arm 45 of the escapement dog 32, wherefore at the end of each tabulation the escapement dog 32 takes uniformly charge over the carriage with almost no additional movement thereof. The control which the cam 296 exercises is such that ample time is allowed for the carriage to settle accurately against the stop 226 before the escapement dog is allowed to reassert its control, this being extremely important because the dog 32 must engage the appropriate fine tooth of the escapement wheel 42.

After the tire 297 turns the cam 296 past its crest, the turn of the cam is concluded by the tension of the legs of the spring 303 against the opposite flats 302. Moreover, the said spring legs will then detent or hold the cam on the arm 294 in the normal position, see Figure 1. As the cam turns toward the stated normal position on the arm 294, the spring 293 swings the shaft assembly 290, 291 and 294 to the position seen in Figure 1, wherein the rear pin 292 of the arm 291 rests limitedly against the rear of the lever 277. This leaves the mechanism in normal state, ready to serve at the end of the next tabulation, or the end of a carriage return, as will become evident hereinafter.

A serious problem arises in proportional spacing typewriters also in connection with carriage returning operations. This is in view of the fact that the escapement must take accurate control over the carriage at the appropriate incremental feed position. To overcome the difficulty, the carriage is brought to rest at power returns in agreement with a certain multiple of the small carriage feed increment, whereby reliable and accurate return control is effected. The mechanism provided for this has partially been described in connection with tabulating mechanism and includes the coarsely toothed wheel 225 and the stop slide 226 which is normally clear of said wheel.

Figure 11:
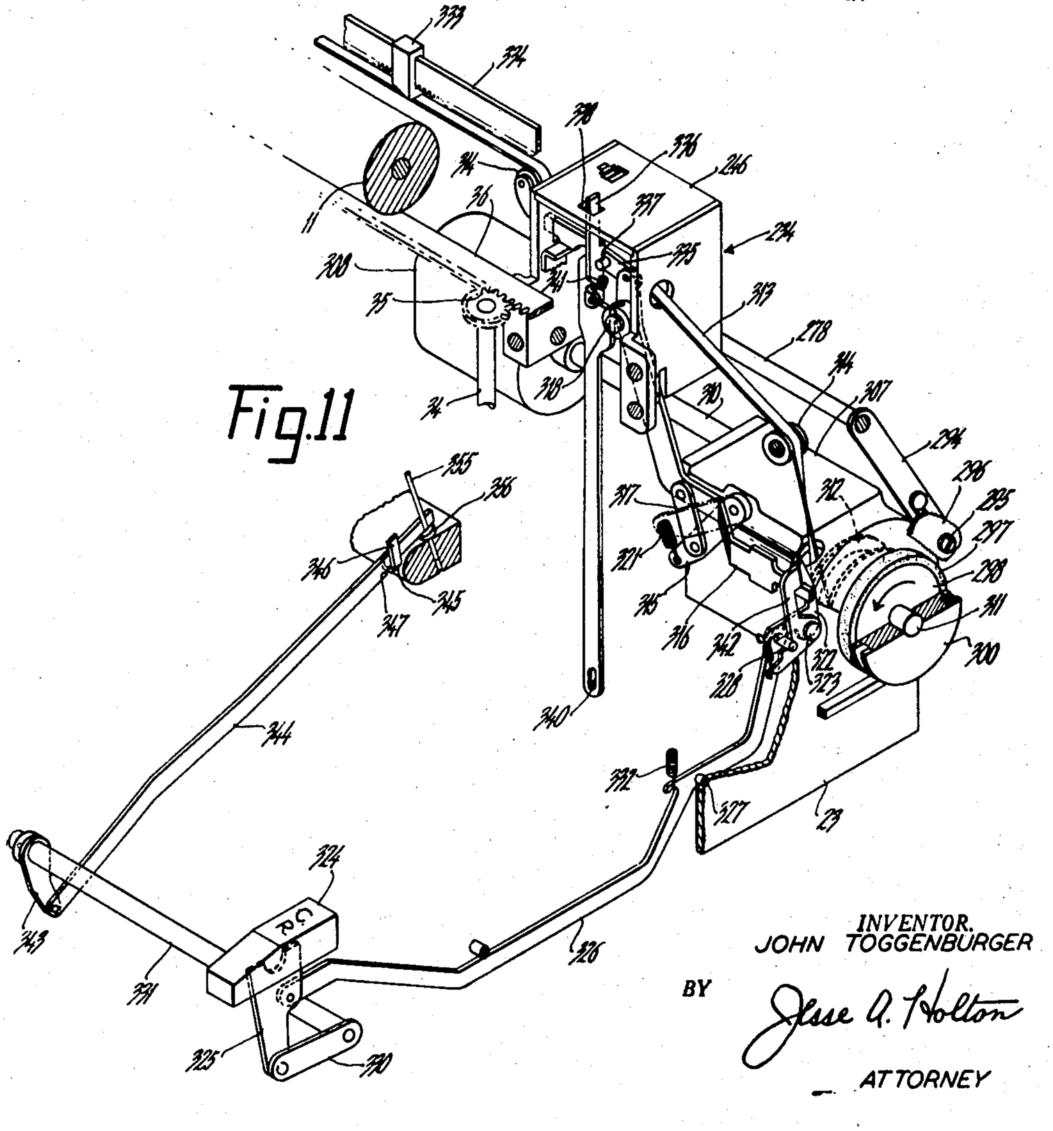
Figure 11 is a right-hand front perspective view of a power return mechanism for a carriage.

Referring to Figure 11, the actual carriage return mechanism may be substantially that of the patent to Sagner No. 2,541,295, dated February 13, 1951. The numeral 307 indicates a speed reduction drive casing. The input shaft 310 of the speed reduction drive is driven by an electric motor 308. Said drive has a driven low-speed shaft 311 carrying outside of said casing 307 the pulley 300 and the wheel 298. The motor 308 runs continuously while the machine is in use, and so said shaft 311. Concentrically arranged with the shaft 311, within the casing 307, is a drum 312 which normally is disconnected from the shaft 311. From said drum extends a carriage return draw band 313, over two idler pulleys 314, to the left end of the carriage 25. A clock spring associated with said drum 312, but not shown, causes the latter to take up slack in the draw band 313. The drum is connectable for rotation by the shaft 311 by movement of a clutch controlling arm 315 from the full-line position to the dotted position, see Figure 11. A lever 316 is connected by a link 317 to the arm 315, the said lever being fast on a short rock shaft 318 having pivotal support in the rear wall of the tabulator housing 234 and a bracket 320 within the housing. The arm 315 is under the constant urge of a spring 321 to move to its closed clutch position, but a latch 322 normally overlies the lever 316 and thereby causes said arm 315 to be held against clutch closure. The said latch 322 has pivotal support on the side wall 23 and is releasable by the operation of a carriage return key 324 which surmounts a stem 325. A lever 326, pivoted at 327, is at its front end pivotally connected with the stem 325 and has a pin 328 underlying a forwardly reaching branch of said latch 322. The lower end of the key stem 325 is pivotally jointed on an arm 330 of a bail comprising shaft 331 extending transversely of the machine and pivoted in the machine side walls 23. The key 324 and connected parts, under the tension of a spring 332, have normally the positions seen in Figure 11. When key 324 is operated the latch 322 swings rearwardly off the lever 316, to allow its upward movement, wherefore the spring 321 will move the arm 315 to closed-clutch position. The drum 312 now clutched to the shaft 311 will wind the draw band 313 thereon to return the carriage. The carriage includes a usual return-terminating margin stop 333 which is adjustably positionable along a rack bar 334 in positions variant in accord with the incremental spacing of the teeth of the coarsely toothed wheel 225. When lever 316 moves upwardly at the release of the latch 322, a slide 335 connected to an arm of the lever, by a pin 337, moves a carriage return counter stop 336 leftwardly in an opening 338 of the housing top plate 246. The carriage return counter stop 336 comprises an upstanding element which at its bottom has pivotal support at 340, and which is under a constant upward and rightward bias of a spring 341. As the return terminating stop 333 in an instituted power return moves rightwardly, it will meet and effect the rightward displacement of the counter stop 336 somewhat beyond the position shown in Figure 11, against the right side of the opening 338, and through the slide 335 will swing the lever 316 clockwise beyond the normal position seen in Figure 11. This results in a clutch opening movement of the arm 315. If the carriage return key 324 has meanwhile been released, the latch 322 will reassert its control over said lever 316. In the event the carriage return key is still held operated at the termination of the return, then an auxiliary latch 342 will temporarily detain said lever 316, the latch 322 taking over control when the key 324 is released. The power return of the carriage is thus terminated automatically.

The escapement dog 32 is moved out of the escapement wheel 33 incidental to each depression of the carriage return key 324. To this end the bail shaft 331 controlled by the carriage return key 324 has leftwardly of the middle of the machine an arm 343 from which extends rearwardly a push link 344. A rear portion of said push link 344 overlies a lug 345 of a lever 346 which is pivotally carried on the shaft 262 and has its upper end posed behind the dog releasing lever 85. The said push link 344 has a shoulder 347 for operation on said lever 346. As said lever 346 effects the operation of the dog releasing lever 85, a latch 348 shown in Figures 1, 2 and 6 swings under the tension of a spring 349 down in back thereof to hold it operated for the duration of the carriage return. The latch 348 is similar to the latch 272 and supported alongside thereof by the same stud 273.

At the time the lever 316 springs to closed-clutch position, an arm 350 on the supporting shaft 318 therefor moves from the Figure 2 position to the Figure 23 position. A hook element 351 pivotally connected with the latch 280 has normally the position seen in Figure 2, resting idly rearwardly against the arm 350. As the arm moves to the position of Figure 23, said hook 351 under the tension of the spring 281 swings rearwardly, rendering the said arm 350 operatively connected with the latch 280 for effecting its release. The said hook element 351 has pivotal connection with said latch at 352 and the spring 281 has the dual purpose of biasing the hook element rearwardly and the latch 280 toward effective position. When at the end of the carriage return the return terminating margin stop 333 displaces the counter stop 336 rightwardly and renders the carriage return drive inactive, the lever 316 operates the arm 350 rightwardly and through said hook effects automatically the release of the latch 280. Resultingly the stop slide 226 snaps into the coarsely toothed wheel 225, the same as at the end of tabulations, the wheel 225 turning at the time still in reverse direction. The mechanism is timed to release the latch 280 when the carriage reaches the position whereat it ultimately is required to come to rest. However, the opening in the top plate 246 permits the carriage to overrun by momentum about two or three increments, whereafter the carriage will settle in carriage feed direction under control of a tooth on the wheel 225 abutting the stop slide 226.

Incidental to the stop slide 226 moving into position in the wheel 225, the arm 291 will swing clockwise of Figure 1 under the tension of the spring 293 so that the cam roll 296 engages the tire 297 and will receive a turn therefrom the same as at the end of a tabulation. When in the first part of such turn the cam reaches the position of Figure 22, the arm 290 will release the latch 348, causing the escapement dog 32 again to take charge over the escapement wheel 33. This is after sufficient time has elapsed for the carriage to settle, that is for a coarse tooth of the wheel 225 to come to rest against the stop slide 226. As the crest of the cam 296 rides onto the tire, the stop slide 226 becomes restored by the front pin 292 of the arm 291. Concomitantly, an arm 354 fast on the shaft 278 pushes the hook 351 forwardly, free of the arm 350, wherefore the latch 280 moves into position to hold again the lever 277 in its restored position. After the slide 226 moves out of the wheel 225, the carriage advances slightly until the escapement wheel 33 catches up solidly against the dog 32. The carriage is then in an accurately returned position.

It is possible that at the time the carriage return run is terminated the operator still holds the carriage return key 324 depressed. So that in such event the lever 346 is free to return at the release of the latch 348, the latter has a rod 355 linked thereto which by a collar 356 is adapted to lift the push link 344 at each release of said latch 348. At its lower end said rod 355 has guidance in a hole provided in the crossbar 170.

The carriage may be effectively and accurately returned if it is only one or two increments advanced from returned position. It will be remembered that the operation of the carriage return key 324 effects the release of the escapement dog 32 through a train of parts 344, 346 and 85. In consequence of this the carriage is adapted to advance momentarily before the carriage return draw band 313 has a carriage returning effect. The stated momentary advance of the carriage moves the return limiting stop 333 leftwardly from the counter stop 336 sufficiently to lend the lever 316 capacity for a full clutch closing movement. The sequence of operation so provided renders the carriage return mechanism reliably operative at all times and the stated sequence is favored also by the draw band 313 picking up the carriage with a delay by first operating a usual line spacing device on the carriage, see the aforementioned patent to Sagner.

An operator may institute a tabulation without there being a tabulation terminating element 228 in a position to engage the element 235 for terminating the tabulation. Under such condition the tabulating run of the carriage is terminated by a line end margin stop 357 riding against and displacing the counter stop 336 leftwardly in the opening 338. The said counter stop 336 has projecting rearwardly therefrom a pin 358 which, as such counter stop is moved leftwardly, displaces the projectable element 235 leftwardly of Figure 12. This releases the latch 280 so that the stop slide 226 will engage the coarsely toothed wheel 225 as in the case of a regularly terminated tabulation. Furthermore, as in a regularly terminated tabulation the cam roll 296 engages the tire 297 and will receive therefrom a cyclic turn. In such cyclic turn, after a first time interval, the release of the latch 272 is effected which causes the engagement of escapement dog 32. After a further time interval the stop slide 226 is restored and all parts assume their normal positions.

It has been stated that responsive to the operation of the carriage return key 324 the carriage return counter stop 336 is moved leftwardly by the lever 316. Obviously, at such time the projectable element 235, even though it is operated leftwardly by the pin 358, must not release the latch 280. To this end the projectable element 235 has a cut-out as at 360 so that it stands in operative range of said latch 280 only when it has been projected for tabulation terminating control.

As stated hereinbefore, the tabulation control elements 228 are provided at intervals corresponding to three feed-increments. This in terms of escapement wheel movement is in accord with the spacing of the teeth on the coarsely toothed wheel 225. Obviously, when it is desired to set an element 228, the carriage may occupy an incremental position wherein none of said elements is in registration with the setter 230. Any control element 228 which is required to be set, therefore, must be brought into registration with the setter 230 before said setter is operated, preferably under control of a key in the keyboard. The control elements 228 are concealed under a cover, not shown, and there arises the problem of how to bring the carriage conveniently and with certainty to the proper incremental position for the setting of a control element 228. It is evident that if the carriage is first moved to bring any element 228 into registration with said setter 230, then the particular element 228 which is required to be set can thereafter be brought accurately and conveniently into registration by simply spacing the carriage in triple feed-increments, forwardly or backwardly.

The machine accordingly includes a device which is operable to effect automatically an incremental relocation of the carriage to bring a tabulation control element 228 into registration with said setter 230. Said device comprises a pawl 361 for back-spacing the wheel 225, located in the plane of the coarsely toothed wheel 225, see Figure 15, and having normally the position shown in this figure, free of the wheel 225. The pawl 361 is linked as at 362 to an arm 363 which is part of a rockable bail comprising a fulcrum shaft 369 and also an arm 364 having a roll 365 contacting a cam 366. The latter is turnably provided on a reduced shaft end 367 of the power roll 15. Adjacent to said cam 366, fast on the shaft end 367, is a toothed wheel 368. A spring 370 urges the arm 364 toward the cam 366 and normally the roll 365 bears on a low spot of the cam as in Figure 19*a*. The said cam 366 carries a pawl 371 which under the urge of a spring 372 tends to couple the cam 366 for rotation with the toothed wheel 368. However, a leg 373 of the pawl 371, intercepted by a dog 374, holds the pawl 371 normally divorced from the wheel 368 as in Figure 19*a*. A key lever 375 has an articulation with the dog 374 to operate the latter free of the pawl 371 and to cause thereby the latter to engage the toothed wheel 368. If the key lever 375 is operated momentarily, then the cam 366 will execute a single turn, causing a reciprocation of the pawl 361. Any number of reciprocations of said pawl 361 can be obtained by holding the lever 375 operated for different time lengths.

The back space pawl 361 is guided near its front end by a stud 376 which reaches upwardly from the escapement bracket 38 into an opening 377. A spring 378 urges the pawl toward the wheel 225 but an edge 380 provided by said opening, by cooperation with the stud 376, causes the pawl to lie normally clear of the wheel 225, as in Figures 15, 17 and 19.

In Figure 15 the wheel 225 is in such an incremental position that one of the tabulation-terminating elements 228 on the carriage is in registration with the setter 230. However, the wheel 225 may normally be in the position seen in Figure 19, namely, one feed increment further advanced. Or it may be in the position seen in Figure 17, namely, two feed increments further advanced. It will now be seen that if an operation of the back space pawl 361 is effected with the wheel initially standing in any of the stated incremental positions, the wheel will be back spaced so that it will reach the same coarse tooth position, namely, slightly beyond the position seen in Figure 16. A face 383 afforded in the opening 377 of said pawl, at the conclusion of the back spacing operation, moves solidly against the stud 376 so that the pawl 361 cannot move leftwardly. Moreover, the front end of the opening contacts solidly the stud, the sum effect being that the wheel becomes blocked against overthrow.

The so limited actuation of the wheel 225 is excessive by a small fraction of one feeding increment, allowing the feed pawl 32 to snap freely into position on the escapement wheel 33, the carriage settling solidly against the dog 32 as the back space pawl returns.

In Figure 17 there is indicated a path which the pawl edge will take to back space the wheel 225 the required fractional tooth space, namely, a double feed increment. Similarly in Figure 19 the path of the pawl edge toward the wheel is indicated, the wheel being back spaced one single feed increment.

After the wheel 225 has been back spaced once, as stated, the carriage can be brought to the appropriate position for setting a tabulation-terminating element 228, by appropriate control of the back space key lever 375 to obtain an appropriate number of operations of the back space pawl 361 or by operation of the three-increments space bar 153.

The machine preferably includes the mechanism of the patent to Sagner No. 2,633,964 dated April 7, 1953, whereby the aforementioned margin stops 333 and 357 are conveniently settable from the keyboard of the machine. In this connection it is to be noted that the stated margin stops are adjustable along the supporting rack 334 to different positions in accord with triple feed increments and that in the process of adjustment of either of said margin stops, the back space key 375 and the space key 153 are selectively used to bring about the required stop relocation.

For back spacing the carriage in single feed increments, there is associated with the escapement wheel 33, see Figure 4, a back spacing pawl 384. This pawl is supported on a lever 385 which normally has the position seen in Figure 4. A spring 386 tends to engage the pawl with the wheel but a pin 387 keeps the pawl normally free thereof. The lever 385, in a manner not shown, is operable rearwardly under control of a single increment back space key 388 shown in Figure 8. The operation of the pawl 384 is limited by a pin 389 so that throw of the wheel 33 is restricted to a little more than one tooth or feed increment.

The mechanism and features of the invention have been exemplified in connection with an escapement rack 33, etc. of rotary form, but, obviously, certain features of the invention are equally useful in connection with toothed members of straight form. Also the proportional feed mechanism may control a type supporting carriage for movement in respect to a paper support.

In general the invention is not restricted to the particular construction or method of operation set forth, but is intended to cover such modifications or departures as may be within the purposes of the improvements or the scope of the claims which follow.

What is claimed is:

1. In a typewriting machine having typing keys, a letter-feed carriage and means for impelling said carriage in linear letter-feed direction; a proportional letter-feed escapement mechanism comprising an escapement wheel having equi-spaced teeth, means connecting said wheel for rotation by the carriage, a spring-actuated dog mounted for movement circumferentially relatively to said wheel and into and out of engagement with said teeth, stop means for limiting circumferential movement of said dog in one direction when in engagement with said teeth, to limit the rotation of the wheel and thereby limit the linear movement of the carriage, means operable under control of all the typing keys to release the dog from engagement with said teeth to allow its circumferential movement in the opposite direction, a series of stop pins arranged circumferentially of said wheel selectively projectable for variably limiting the circumferential movement of the dog in said opposite direction and causing re-engagement of said dog with said teeth when the dog reaches any stop pin, said stop pins being selectively projectable under control of certain of said typing keys, a stop member normally positioned for limiting said dog in said opposite direction to a shorter circumferential movement than that obtainable by the projection of at least one of said stop pins, and means mounting said stop member for engagement by and movement to an ineffective position by the projection of at least said one stop pin.

2. In a typewriting machine having typing keys, a letter-feed carriage and means for impelling said carriage in linear letter-feed direction; a proportional letter-feed escapement mechanism comprising an escapement wheel having equi-distant spaced teeth, means connecting said wheel for rotation by the carriage, a spring-actuated dog mounted for movement circumferentially relatively to said wheel and into and out of engagement with said teeth, stop means for limiting circumferential movement of said dog in one direction when in engagement with said teeth, to limit the rotation of the wheel and thereby limit the linear movement of the carriage, means operable under control of the typing keys to release the dog from engagement with said teeth to allow its circumferential movement in the opposite direction, a series of stop pins arranged circumferentially of said wheel selectively projectable endwise for variably limiting the circumferential movement of the dog in the opposite direction and causing re-engagement of said dog with said teeth when the dog reaches any stop pin, said stop pins being selectively projectable under control of certain of said keys, a stop member normally positioned for limiting said dog in said opposite direction to a circumferential movement which is shorter than the same directional circumferential movements obtainable under control of certain of said stop pins, and means mounting said stop member swingably for engagement by and movement to an ineffective position by the projection of any of said certain stop pins.

3. In a typewriting machine having typing keys, a letter-feed carriage and means for impelling said carriage in linear letter-feed direction; a proportional letter-feed escapement mechanism comprising an escapement wheel having equi-distant spaced teeth, means connecting said wheel for rotation by the carriage, a spring-actuated dog mounted for movement circumferentially relatively to said wheel and into and out of engagement with said teeth, stop means for limiting circumferential movement of said dog in one direction when in engagement with said teeth, to limit the rotation of the wheel and thereby limit the linear movement of the carriage, means operable under control of the typing keys to release the dog from engagement with said teeth to allow its circumferential movement in the opposite direction, a series of stop pins arranged circumferentially of said wheel and selectively projectable for variably limiting the circumferential movement of the dog in said opposite direction and causing re-engagement of said dog with said teeth when the dog reaches any stop pin, said stop pins being selectively projectable under control of certain of said keys, a stop member normally in position to limit the circumferential movement of said dog in said opposite direction and situated in the projecting range of at least one of said stop pins, means to mount said member for displacement out of limiting position by any stop pin in the projecting range of which it is normally situated, and spring means urging said stop member to its normal position.

4. In a typewriting machine having typing keys, a letter-feed carriage and means for impelling said carriage in linear letter-feed direction; a proportional letter-feed escapement mechanism comprising an escapement wheel having equi-distant spaced teeth, means connecting the escapement wheel for rotation by the carriage, a spring pressed dog mounted for movement circumferentially relatively to said wheel and into and out of engagement with said teeth, stop means for limiting the circumferential movement of said dog in a carriage advancing direction when in engagement with said teeth, to limit the rotation of the wheel and thereby to limit the linear movement of the carriage in said letter-feed direction, means operable under control of the typing keys to release the dog from engagement with said teeth, allowing its circumferential movement directionally opposite to the said advancing direction, a series of stop pins arranged circumferentially of said wheel for variably limiting said opposite directional circumferential movement of said dog, springs individual to said stop pins to hold them normally out of limiting range of said dog, the individual stop pins being selectively projectable under control of said typing keys, a stop member normally situated in movement-limiting range of said dog and in the projecting path of at least one of the stop pins, means to mount said stop member for displacement out of movement-limiting range by any stop pin in the projecting path of which said member is situated, and spring means to bias said stop member to its normal position.

5. In a typewriting machine having typing keys, case shift means, a letter-feed carriage and means for impelling said carriage in linear letter-feed direction; a proportional letter-feed escapement mechanism comprising an escapement wheel having equi-distant spaced teeth, means connecting said wheel for rotation by the carriage, a spring actuated dog mounted for movement circumferentially relatively to said wheel and into and out of engagement with said teeth, stop means for limiting the movement of said dog in one direction when in engagement with said teeth, to limit the rotation of the wheel and thereby limit the linear movement of the carriage, means operable under control of the typing keys to release the dog from engagement with said teeth to allow its circumferential movement in the opposite direction, a series of stop pins arranged circumferentially of said wheel and selectively projectable for variably limiting the circumferential movement of the dog in the opposite direction and causing re-engagement of the dog with said teeth when the dog reaches any stop pin, said stop pins being selectively projectable under control of certain of the typing keys, a means having two stops to limit the circumferential movement of said dog in the opposite direction, said stop means situated in the projecting range of at least one of said stop pins and having one of its stops normally in movement-limiting range of said dog, means controlled by said case shift means to condition said stop means for its other stop to limit said dog, and means to mount said stop means for movement out of limiting range of said dog by any stop pin in whose projecting range it may be situated.

6. In a typewriting machine having typing keys, case shift means, a letter-feed carriage and means for impelling said carriage in linear letter-feed direction; a proportional letter-feed escapement mechanism comprising an escapement wheel having equi-distant spaced teeth, means connecting said wheel for rotation by the carriage, a spring actuated dog mounted for movement circumferentially relatively to said wheel and into and out of engagement with said teeth, stop means for limiting the movement of said dog in one direction when in engagement with said teeth, to limit the rotation of the wheel and thereby limit the linear movement of the carriage, means operable under control of the typing keys to release the dog from engagement with said teeth to allow its circumferential movement in the opposite direction, a series of stop pins arranged circumferentially of said wheel and selectively projectable for variably limiting the circumferential movement of the dog in said opposite direction and causing re-engagement of the dog with said teeth when the dog reaches any stop pin, said stop pins being selectively projectable under control of certain of the typing keys, an arm having two stops to limit the circumferential movement of said dog in said opposite direction to one or another limit, said arm situated in the projecting range of at least one of said stop pins and having one of its stops normally in movement-limiting range of said dog, means controlled by said case shift means to move said arm for its other stop to limit said dog, and means to mount said arm for movement out of limiting range of said dog by any stop pin in whose projecting range it may be situated.

7. In a typewriting machine having a complement of type keys, a complement of type actions adapted for operation to effect imprints of varying widths, power actuators for said type actions selectively responsive to said keys, and a carriage impelled for imprint spacing movement; means to letter-feed the carriage generally proportionally to the widths of the imprints being effected by said type actions, comprising stepping means controllable for different-extent movements in order to step said carriage proportionally to each imprint being made, a series of step-determining stops for said stepping means to control it for said different-extent movements, said stops including an intermediate one which is normally in controlling position and the other of said stops being normally out of controlling position, electromagnets for individually operating said other stops to their controlling positions, circuitry for said electromagnets, including a source of electric current and normally open circuit-closing contact means for the individual electromagnets, means to close said contact means selectively by operations of certain of said type actions for said electromagnets to operate said other stops selectively into controlling positions in accord with the proportional step movements required at the operations of these certain type actions, said closing means effective on said contact means near the ends of the imprint-effecting operations of said certain type actions, and means to move said intermediate stop out of said controlling position incidental to the operation of any stop providing for a greater extent movement than said intermediate stop.

8. In a typewriting machine having a frame, a complement of type keys, a complement of type actions adapted to effect imprints of varying widths, power actuators for said type actions selectively responsive to said keys, and a carriage on said frame impelled for imprint spacing movement; means controlled by the type actions at the operations thereof to letter-step the carriage generally proportionally to the widths of the imprints effected by the type actions, comprising a member having a row of carriage-feed teeth, a stepping means normally in carriage-holding engagement with said member, said member and said stepping means being one associated with the carriage for movement thereby and the other carried on the frame, means to mount said stepping means for release from said member and for feed-step determining movements along said row of teeth to differential extents to re-engage said member in various feed-step determining relationships, universal bar means operable by all said type actions to release said stepping means for executing feed-step-determining movements, a series of stops to control differentially the feed-step-determining movements of said stepping means including an intermediate stop normally in controlling position and readily instrumental at the operation of the said universal bar by many of the type actions to limit the released stepping means, the other stops normally out of controlling positions but operable individually thereto, electromagnets individual to said other stops to operate them, means to move said intermediate stop out of controlling position by the operation of any other stop determining a greater feed-step movement, and means to energize said electromagnets selectively under control of such of the type actions which for proportional imprint spacing of the carriage call for feed-step-determining movements of said stepping means differing from that normally obtainable under control of the intermediate stop.

9. In a typewriting machine having a complement of typing keys, a complement of type actions adapted to effect imprints of varying widths, power actuators for said type actions selectively responsive to said keys, and a carriage impelled to advance for imprint spacing; a proportional letter-feed mechanism comprising an escapement wheel having equi-spaced teeth, means to rotate said wheel by the travel of the carriage, a stepping means normally in engagement with said wheel to restrain it against rotation in a feed direction allowing imprint advance of the carriage, said stepping means mounted for movement circumferentially of said wheel and into and out of engagement with the teeth thereof, stop means for limiting circumferential movement of said stepping means in the feed direction of said wheel thereby to limit normally the rotation of said wheel in said feed direction, spring means urging said stepping means to move counter to the feed direction of said wheel, means operable by any type action to move said stepping means out of engagement with the wheel teeth for circumferential movement from said stop means, a stop normally in range of said stepping means for limiting its circumferential movement from said stop means to a given extent and to cause automatically its re-engagement with said wheel for ensuingly controlling the latter for carriage-advance limiting action, a series of other stops selectively operable for variably limiting said stepping means for other-extent movements followed by re-engagements with said wheel, electromagnets for operating said other stops, circuitry for said electromagnets, including a source of electric current and normally open circuit-closing contact means for the individual electromagnets, means to control said contact means selectively by operations of certain of said type actions so that said other stops will be operated in accord with proportional imprint spacing requirements in connection with the operation of each such type action, said control means effective on said contact means near the ends of the imprint-effecting operations of said certain type actions, and means to move said first stop out of controlling position incidental to any operation of one of said other stops determining a greater extent of circumferential movement of said stepping means than the first said stop.

10. In a typewriting machine having a complement of typing keys, a complement of type actions adapted to effect imprints of varying widths, power actuators for said type actions selectively responsive to said keys, and a carriage impelled to advance for imprint spacing; a mechanism to control the carriage to advance proportionally to the width of each imprint made, comprising an escapement wheel having equi-spaced teeth, means to rotate said wheel by the travel of the carriage, a stepping means normally in engagement with said wheel to restrain it against rotation in a feed direction for imprint advance of the carriage, said stepping means mounted for movement circumferentially of said wheel and into and out of engagement with the teeth thereof, stop means for limiting circumferential movement of said stepping means in the feed direction of said wheel thereby to limit normally the rotation of said wheel in said feed direction, spring means urging said stepping means to move counter to the feed direction of said wheel, means operable by any type action to move said stepping means out of engagement with the wheel teeth for circumferential movement from said stop means, a stop normally in range of said stepping means for limiting its circumferential movement from said stop means to a given extent, a series of other stops selectively operable for variably limiting said stepping means for other-extent movements, such other stops including one limiting said stepping means to a longer movement, any of said stops in limiting the movement of the stepping means causing its re-engagement with said wheel for ensuingly controlling the latter for a carriage advance limiting action, electromagnets for operating said other stops, circuitry for said electromagnets, including a source of electric current and normally open circuit-closing contact means for the individual electromagnets, and means to control said contact means selectively by operations of certain of said type actions so that said other stops will be operated in accord with proportional imprint spacing requirement in connection with the operation of each such type action, said control means effective on said contact means near the ends of the imprint-effecting operations of said certain type actions, and said first stop being operable to ineffective position by the stop which limits said stepping means to said longer movement.

11. In a typewriting machine having a complement of type actions adapted to effect imprints of varying widths, and a letter-feeding carriage; the combination with a member having a row of carriage-feed teeth, of means to letter-step the carriage generally proportionally to the widths of the imprints being effected by said type actions, comprising stepping means associated with the row of teeth of said member and controllable for different extents of movements in engagement with the teeth of said member in order to step said carriage proportionally to each imprint being made, a series of step-determining stops for said stepping means to control it for said different-extent movements, said stops including a swingably mounted intermediate stop normally in a movement-limiting position, and a series of stop pins individually projectable endwise into movement-limiting positions, and electromagnetic means variously responsive to the operations of only certain of said type actions to project said stop pins selectively in accord with the particular step movements called for by the particular type action which is operated, said intermediate stop being swingably mounted for movement out of movement-limiting position by the projection of any stop pin which determines a greater feed step than that which is determinable by said intermediate stop.

12. In a typewriting machine having a complement of type keys, a complement of type actions adapted for operation to effect imprints of varying widths, power actuators for said type actions selectively responsive to said keys, and a letter-feeding carriage; the combination with a member having a row of carriage-feed teeth, of means to letter-feed the carriage generally proportionally to the widths of the imprints being effected by said type actions, comprising stepping means associated with the row of teeth of said member and controllable for different-extent movements in engagement with the teeth of said member in order to step said carriage proportionally to each imprint being made, a series of step-determining stops for said stepping means to control it for said different-extent movements, said stops including an intermediate one which is normally in controlling position and the other of said stops being normally out of controlling position, electromagnets for operating said other stop to controlling position, circuitry for said electromagnets, including a source of electric current and normally open circuit-closing contact means for the individual electromagnets, means to close said contact means selectively by operations of certain of said type actions for said electromagnets to operate said other stops to controlling positions in accord with the individually required proportional step movements for these certain type actions, said closing means including type-action-operable link-elements and pivoted contact closing arms operable by said link-elements, and means to move said intermediate stop out of said controlling position incidental to operation of any stop determining a greater feed step than said intermediate stop.

13. In a typewriting machine having lower-case and upper-case types to effect imprints of varying widths, case-shift means operable from a lower to ar upper case position, type keys, and means variously responsive to said keys to cause selective imprints from the lower-case or the upper-case types, depending on the case position of said case-shift means; a carriage impelled to advance for imprint spacing, and means to control the carriage to advance proportionally to the widths of individual imprints made, comprising carriage-stepping means normally in control of the carriage, a series of stops selectively operable to condition said stepping means for stepping the carriage proportionally to the widths of said individual imprints, an electromagnet to operate each stop, and circuitry for said magnets comprising a source of electric power, a series of normally open parallel circuits adapted for selective closure under control of said keys, and electrical switching means arranged between said parallel circuits and said magnets and controlled by said case-shift means so that closure of each different parallel circuit under the control of said keys, depending on the position of the case-shift means, will result in the energization of a particular one or a particular other of said magnets, said particular magnets energizable by the closures of the different parallel circuits being of differing combinations.

14. In a typewriting machine having a complement of type keys, a complement of type actions adapted to effect imprints and having each a lower and an upper case type, power actuators selectively responsive to said keys to operate said type actions, and case shift means normally in one position so that said type actions will print by the lower case types and operable to another position so that they will print by the upper case types, the combination with a letter-feeding carriage, of means to letter-feed the carriage responsive to each actuation of a type action generally proportionally to the width of the lower or the upper case imprint being effected, comprising stepping means limitable for different-extent movements in order to step said carriage proportionally to each effected imprint, universal bar means subject to operations of said type actions to cause an operation of said stepping means, a lower-case space-controlling stop normally in position to limit said stepping means for a certain step-determining movement, an upper-case space-controlling stop for limiting said stepping means for another step-determining movement, but normally out of stopping position, means operable by said case shift means to place said second stop in limiting position and concomitantly to remove the first stop from limiting position, said two space-controlling stops being readily controlling at the operation of certain type actions, other proportional feed-step determining stops normally out of stopping position but operable thereinto and including at least one stop for determining a greater feed step movement than either of said first two stops, means to incapacitate said first two stops whenever a stop is operated determining a greater feed step movement than either of said first two stops, a normally de-energized electromagnet for each of said other stops, and circuitry for said electromagnets, comprising a source of electric current for energizing said electromagnets, a number of contact means variously adapted to be closed by operations of certain type actions which for proportional letter-feeding of the carriage in one or both positions of the case shift means require an operation of one of said other stops for limiting said stepping means, and electrical switch means variously in series with certain of said contact means and certain of said electromagnets, so controlled by said case shift means that severally the operations of said certain type actions for upper and lower case typing will result in the energization of the appropriate electromagnets as required for appropriate control of said other stops to produce proportional letter-feeding of the carriage.

15. In a typewriting machine having a complement of typing keys, a complement of type actions adapted to effect imprints and having each a lower and an upper case type, power actuators selectively responsive to said keys to operate said type actions, and case-shift means normally in one position so that said type actions will print by the lower case types and operable to another position so that they will print by the upper case types; a carriage impelled to advance for imprint spacing, and means to control the carriage to advance proportionately to the widths of each imprint made, comprising carriage stepping means normally in control of the carriage and responsive to operations of said type actions, a series of stops adapted to limit variously said stepping means for it to step the carriage proportionately to the widths of individual imprints, means controlled by said case-shift means so that normally one or another of said stops is in limiting range of said stepping means, said one or other stop being readily controlling at the operation of many of the type actions, said series of stops including further stops operable into stopping range of said stepping means and including at least one stop for determining a greater-feed step advance of the carriage than either of said first two stops, means to incapacitate said first two stops whenever one of said other stops determining a movement greater than said first two stops is operated, an electromagnet to operate each of said further stops, and circuitry for said magnets comprising a source of electric power, a series of normally open parallel circuits adapted for selective closure under control of other of said type actions, and electrical switching means arranged between said parallel circuits and said magnets and controlled by said case-shift means so that closure of different parallel circuits, depending on the position of the case-shift means, will result in the energization of a particular one or a particular other of said magnets, said particular magnets energizable by the closure of the different parallel circuits being of differing combinations.

16. In a typewriting machine having typing keys, case shift means, a letter-feed carriage and means for impelling said carriage in linear advance direction; a proportional letter-feed escapement mechanism comprising an escapement wheel having equi-distant spaced teeth, means connecting said wheel for rotation by the carriage, a spring actuated dog mounted for movement circumferentially relatively to said wheel and into and out of engagement with said teeth, stop means for limiting the movement of said dog in one direction when in engagement with said teeth, to limit the rotation of the wheel and thereby limit the linear advance of the carriage, means opraeble under control of the typing keys to release the dog from engagement with said teeth to allow its circumferential movement in the opposite direction, a series of stop pines arranged circumferentially of said wheel and selectively projectable for variably limiting the circumferential movement of the dog in said opposite direction and causing re-engagement of it with said teeth when the dog reaches any stop pin, a means having two stops to limit the circumferential movement of said dog in said opposite direction, said stop means situated in the projecting range of at least one of said stop pins and having one of its stops normally in movement-limiting range of said dog, means controlled by said case-shift means to condition said stop means for its other stop to stand in movement limiting range of said dog, means to mount said stop means for movement out of limiting range of said dog by any stop pin in whose projecting range it may be situated, an electromagnet to project each of said stop pins, and circuitry for said magnets comprising a source of electric power, a series of normally open parallel circuits adapted for selective closure under control of other of said typing keys, and electrical switching means arranged between said parallel circuits and said magnets and controlled by said case-shift means so that closure of different parallel circuits, depending on the position of the case-shift means, will result in the energization of a particular one or a particular other of said magnets, said particular magnets energizable by the closure of the different parallel circuits being of differing combinations.

17. In a typewriter having typing keys, a paper carriage and means for impelling said carriage in linear letter feed direction; a variable letter-feed escapement mechanism comprising an escapement wheel having equi-distant spaced teeth, means connecting said wheel for rotation by the carriage, a spring-pressed dog mounted for movement circumferentially relatively to said wheel and into and out of engagement with said teeth, stop means for limiting the movement of said dog in one direction when in engagement with said teeth, to limit the rotation of the wheel and thereby limit the linear movement of the carriage, means operable under control of the typing keys to release the dog from engagement with said teeth, allowing its circumferential movement, a series of stops arranged circumferentially for variably limiting the circumferential movement of the dog and causing re-engagement of it with said teeth when the dog reaches any stop, the stops of said series being selectively positionable under control of the typing keys, one of said stops being normally spring-pressed into stop position, another of said stops being normally spring-pressed out of stop position and adapted to be moved into stop position in advance of the first said stop, and still another stop of said series being normally spring-pressed out of stop position and adapted to be moved into the path of said dog while at the same time disabling the first said stop, a second toothed wheel fixed for rotation with the first wheel, and a second dog engageable with the teeth of the second wheel incidental to the first dog being moved out of engagement with the teeth of its wheel.

18. In a typewriter having typing keys, a paper carriage and means for impelling said carriage in linear letter feed direction; a variable letter-feed escapement mechanism comprising an escapement wheel having equidistant spaced teeth, means connecting said wheel for rotation by the carriage, a spring actuated dog mounted for movement circumferentially relatively to said wheel and into and out of engagement with said teeth, stop means for limiting the movement of said dog in one direction when in engagement with said teeth to limit the rotation of the wheel and thereby limit the linear movement of the carriage, means operable under control of the typing keys to release the dog from engagement with said teeth, allowing its circumferential movement, a series of stops arranged circumferentially for variably limiting the circumferential movement of the dog and causing re-engagement of it with said teeth when the dog reaches any stop, the stops of said series being selectively positionable under control of the typing keys, a second toothed wheel fixed for rotation with the first, and a second dog engageable with the teeth of the second wheel while the first dog is moved out of engagement with the teeth of its wheel.

19. In a typewriting machine having typing keys, a letter-feed carriage and means for impelling said carriage in linear letter-feed direction; a proportional letter-feed escapement mechanism comprising an escapement wheel having a set of circularly evenly spaced teeth, means connecting said wheel for rotation by the carriage, a spring-actuated dog mounted for movement circumferentially relatively to said wheel and into and out of engagement with said teeth, stop means for limiting circumferential movement of said dog in one direction when in engagement with said teeth, to limit the rotation of said wheel and thereby limit the linear movement of the carriage, a lever operable to release said dog from engagement with said teeth to allow its circumferential movement in the opposite direction, a series of stops arranged circumferentially of said wheel for variably limiting the circumferential movement of said dog in said opposite direction and causing re-engagement of it with said teeth when the dog reaches any stop, typing key controlled selecting means for said stops, another set of circularly-spaced teeth fixed for conjoint rotation with said escapement wheel, a second dog normally clear of said second set of teeth and operable for wheel-halting cooperation therewith, said second dog having an operating arm contiguous with an operating arm of said lever, a member operated in response to all the typing keys for operating action directly on said lever arm and said operating arm to operate them conjointly, and means to operate said lever arm without said operating arm.

20. In a typewriting machine having types of varying imprint widths selectively operable to type, and a carriage impelled to advance for imprint spacing; a mechanism to control the carriage to advance proportionally to the width of each imprint made, comprising a wheel having circularly spaced escapement teeth, means to rotate said wheel by the advance of the carriage, a stepping means normally in engagement with said wheel to restrain it in a carriage-advancement direction, mounted for movement circumferentially of said wheel and into and out of engagement with the teeth thereof, stop means normally engaged by said stepping means to limit movement of the latter in carriage-advancement direction and thereby to restrain the carriage against advancement, means to urge said stepping means circumferentially of said wheel from said stop means when it is out of engagement with said teeth, means automatically effective upon movement of said stepping means against said stop means to hold it substantially thereat, other circularly spaced teeth differently formed than said escapement teeth for conjoint rotation with said wheel, dog means normally clear of said other circularly spaced teeth and actuatable for wheel-halting co-action therewith, means operated incidental to each selective operation of a type to release said holding means, actuate said dog means and concomitantly thereto to move said stepping means free of said wheel for movement by said urging means from said stop means, and means differentially controlled by the selective operations of said types to limit variably the movement of said stepping means from said stop means and to cause re-engagement of said stepping means with said wheel.

21. In a typewriting machine having types of varying imprint widths selectively operable to type, and a carriage impelled to advance for imprint spacing; a mechanism to control the carriage to advance proportionally to the width of each imprint made, comprising a wheel having circularly spaced escapement teeth, means to rotate said wheel by the advance of the carriage, a stepping means normally in engagement with said wheel to restrain it in a carriage-advancement direction, mounted for movement circumferentially of said wheel and into and out of engagement with the teeth thereof, stop means normally engaged by said stepping means to limit movement of the latter in carriage-advancement direction and thereby to restrain the carriage against advancement, means to urge said stepping means circumferentially of said wheel from said stop means when it is out of engagement with said teeth, means automatically effective upon movement of said stepping means against said stop means to hold it substantially thereat, other circularly spaced teeth differently formed than said escapement teeth for conjoint rotation with said wheel, dog means normally clear of said other circularly spaced teeth and actuatable for wheel-halting co-action therewith, means operated incidental to each selective operation of a type to release said holding means, actuate said dog means and concomitantly thereto to move said stepping means free of said wheel for movement by said urging means from said stop means, and means differentially controlled by the selective operations of said types to limit variably the movement of said stepping means from said stop means and to cause re-engagement of said stepping means with said wheel, means to tabulate the carriage to different positions comprising tabulation instituting means, tabulation terminating means, and means responsive to said instituting and said terminating means respectively to move said stepping means free of said wheel and to apply it again.

22. In a typewriting machine having types of varying imprint widths selectively operable to type, and a carriage impelled to advance for imprint spacing; a mechanism to control the carriage to advance proportionally to the width of each imprint made, comprising a wheel having circularly spaced escapement teeth, means to rotate said wheel by the advance of the carriage, a stepping means normally in engagement with said wheel to restrain it in a carriage-advancement direction, mounted for movement circumferentially of said wheel and into and out of engagement with the teeth thereof, stop means normally engaged by said stepping means to limit movement of the latter in carriage-advancement direction and thereby to restrain the carriage against advancement, means to urge said stepping means circumferentially of said wheel from said stop means when it is out of engagement with said teeth, means automatically effective upon movement of said stepping means against said stop means to hold it substantially thereat, other circularly spaced teeth differently formed than said escapement teeth for conjoint rotation with said wheel, dog means normally clear of said other circularly spaced teeth and actuatable for wheel-halting co-action therewith, means operated incidental to each selective operation of a type to release said holding means, actuate said dog means, and concomitantly thereto to move said stepping means free of said wheel for movement by said urging means from said stop means, and means differentially controlled by the selective operations of said types to limit variably the movement of said stepping means from said stop means and to cause re-engagement of said stepping means with said wheel, and means to move said stepping means free of said wheel for free movement of the carriage.

23. In a typewriter machine having types of varying imprint widths selectively operable to type, and a carriage impelled to advance for imprint spacing; a mechanism to control the carriage to advance proportionally to the width of each imprint made, comprising a wheel having circularly spaced escapement teeth, means to rotate said wheel by the advance of the carriage, a stepping means normally in engagement with said wheel to restrain it in a carriage-advancement direction, mounted for movement circumferentially of said wheel and into and out of engagement with the teeth thereof, stop means normally engaged by said stepping means to limit movement of the latter in carriage-advancement direction and thereby to restrain the carriage against advancement, means to urge said stepping means circumferentially of said wheel from said stop means when it is out of engagement with said teeth, means automatically effective upon movement of said stepping means against said stop means to hold it substantially thereat, other circularly spaced teeth differently formed than said escapement teeth for conjoint rotation with said wheel, dog means normally clear of said other circularly spaced teeth and actuatable for wheel-halting co-action therewith, means operated incidental to each selective operation of a type to release said holding means, actuate said dog means and concomitantly thereto to move said stepping means free of said wheel for movement by said urging means from said stop means, and means differentially controlled by the selective operations of said types to limit variably the movement of said stepping means from said stop means and to cause re-engagement of said stepping means with said wheel, power-return means for the carriage, means operable and restorable to render said power-return means respectively effective and ineffective and means to operate said stepping means free of said wheel for the duration the said power-return means is effective.

24. In a typewriting machine having types of varying imprint widths selectively operable to type, and a carriage impelled to advance for imprint spacing; a mechanism to control the carriage to advance proportionally to the width of each imprint made, comprising a wheel having circularly spaced escapement teeth, means to rotate said wheel by the advance of the carriage, a stepping means normally in engagement with said wheel to restrain it in a carriage-advancement direction, mounted for movement circumferentially of said wheel and into and out of engagement with the teeth thereof, stop means normally engaged by said stepping means to limit movement of the latter in carriage-advancement direction and thereby to restrain the carriage against advancement, means to urge said stepping means circumferentially of said wheel from said stop means when it is out of engagement with said teeth, other circularly spaced teeth differently formed than said escapement teeth for conjoint rotation with said wheel, dog means normally clear of said other circularly spaced teeth and actuatable for wheel-halting co-action therewith, means operated incidental to each selective operation of a type to actuate said dog means and concomitantly thereto to move said stepping means free of said wheel for movement by said urging means from said stop means, and means differentially controlled by the selective operations of said types to limit variably the movement of said stepping means from said stop means, and means including a control member on the carriage to move said stepping means free of said wheel for movement of the carriage free thereof.

25. In a typewriting machine having type keys, case shift means capable of being given one or another case shift position, a letter-feed carriage and means for impelling said carriage for movement in letter-feed direction; a proportional letter-feed escapement mechanism comprising an escapement wheel having equi-distant spaced teeth, means to rotate said wheel by movement of the carriage, a dog mounted for movement circumferentially relatively to said wheel and into and out of engagement with said teeth, stop means for limiting the movement of said dog in one direction when in engagement with said teeth, thereby to limit the rotation of said wheel and the movement of the carriage in letter-feed direction, spring means to urge said dog in the opposite direction, means operable under control of said type keys to release said dog from engagement with said teeth to allow its circumferential movement in said opposite direction by said spring means, a series of stop elements arranged circumferentially of said wheel and selectively projectable from idle to operative positions for variably limiting the circumferential movement of said dog in said opposite direction and causing re-engagement of the dog with said teeth when the dog reaches any projected stop element, said stop elements being selectively projectable under control of certain of said type keys, another stop element having two stopping faces for limiting the circumferential movement of said dog in said opposite direction to two different limits, means to mount said other stop element for movement transversely of the direction of projection of said first stop elements to occupy one or another position for one or the other stopping face to lie in the path of the dog, and to mount it further for movement by at least one of said first stop elements generally in the said direction of projection thereof, completely out of stopping range of said dog, and means controlled by the case shift means to move said other stop element to said one or the said other position in response respectively to the movement of the case shift means to the said one or the said other case position.

26. The invention set forth in claim 25, the means controlled by the case shift means including resilient means to effect movement of the said other stop element from at least one of its positions to the other.

27. In a typewriter machine having a frame, typing keys, a carriage and means for impelling the carriage to advance in a letter-feed direction; a mechanism differentially responsive to said keys to letter-feed the carriage varying multiples of a certain feed increment, comprising a succession of teeth which in terms of carriage controlling capability are spaced to correspond with said feed increment, a stepping means normally in engaged association with the teeth of said succession to hold thereby the carriage against advance, said stepping means and said succession of teeth being one connected for movement by carriage and the other carried on the frame, means rsponsivee to said keys to render said stepping means free of said teeth and variably to cause new engagement associations with said teeth enabling the carriage to execute feed steps of different numbers of feed increments, and means responsive to the operations of said keys to detain the carriage momentarily against advance while the stepping means assumes each of its new engaged associations, said detaining means comprising a succession of teeth which are spaced in terms of carriage controlling capability the same as the teeth of the first mentioned succession, an element operable to engage the second of said successions of teeth for temporarily holding the carriage against advance, said element and said second succession of teeth being one movable by the carriage and the other provided on the frame, and means transitorily operated responsive to said keys, to operate said holding element into engagement with said second succession of teeth, the teeth of said second succession being so formed and said element being so correlated therewith that the carriage in tending to advance exerts an influence favoring the restoration of the element.

References Cited in the file of this patent

UNITED STATES PATENTS

| | | |
|---|---|---|
| 2,111,410 | Stickney | Mar. 15, 1938 |
| 2,211,911 | Reid | Aug. 20, 1940 |